US011073942B2

(12) United States Patent
Lee et al.

(10) Patent No.: US 11,073,942 B2
(45) Date of Patent: Jul. 27, 2021

(54) TOUCH RECOGNITION METHOD AND ELECTRONIC DEVICE EXECUTING SAME

(71) Applicant: Samsung Electronics Co., Ltd., Suwon-si (KR)

(72) Inventors: Sung Jun Lee, Suwon-si (KR); Jae Min Lee, Suwon-si (KR); Jun Ik Lee, Suwon-si (KR); Ki Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 16/060,820

(22) PCT Filed: Nov. 14, 2016

(86) PCT No.: PCT/KR2016/013102
§ 371 (c)(1),
(2) Date: Jun. 8, 2018

(87) PCT Pub. No.: WO2017/099378
PCT Pub. Date: Jun. 15, 2017

(65) Prior Publication Data
US 2020/0264727 A1   Aug. 20, 2020

(30) Foreign Application Priority Data
Dec. 8, 2015  (KR) ........................ 10-2015-0173930

(51) Int. Cl.
G06F 3/041   (2006.01)
G06F 3/044   (2006.01)

(52) U.S. Cl.
CPC ............ *G06F 3/0418* (2013.01); *G06F 3/044* (2013.01); *G06F 3/0412* (2013.01); *G06F 3/04162* (2019.05); *G06F 2203/04105* (2013.01)

(58) Field of Classification Search
CPC ......... G06F 2203/04105; G06F 3/0414; G06F 3/044; G06F 3/0443; G06F 3/0445;
(Continued)

(56) References Cited

U.S. PATENT DOCUMENTS 8,780,055 B2   7/2014 Marchand et al.
9,288,390 B2   3/2016 Hong et al.
(Continued)

FOREIGN PATENT DOCUMENTS

KR   10-2010-0018883 A   2/2010
KR   10-2010-0044770 A   4/2010
(Continued)

OTHER PUBLICATIONS

ISA/KR, "International Search Report and Written Opinion of the International Searching Authority," International Application No. PCT/KR2016/013102, dated Feb. 7, 2017, 11 pages.

*Primary Examiner* — Duc Q Dinh

(57) ABSTRACT

An electronic device according to an embodiment disclosed in the present specification may comprise a processor, a touch panel for receiving a touch input, a pressure sensor for detecting a pressure value of the touch input, and a controller for transmitting to the processor touch data corresponding to the touch input. The controller responds to the touch input if the pressure value of the touch input is a threshold value or greater, switches an operation mode of the controller from a first mode to a second mode, and can transmit the touch data to the processor in the second mode. Besides this, various embodiments are possible as identified in the specification.

5 Claims, 20 Drawing Sheets

(58) Field of Classification Search
CPC ........... G06F 2203/04106; G06F 1/325; G06F
1/3259; G06F 1/3265; G06F 3/0418;
G06F 3/04162; G06F 3/0412; G06F
3/03547; G06F 3/0383; G06F
2203/04104; G06F 1/3262; G06F 1/3203;
G06F 2203/04808; G06F 3/04142; G06F
3/04144; G06F 3/04164; G06F 3/0416;
G06F 3/0488
USPC .................................................. 345/173–175
See application file for complete search history.

(56) References Cited

U.S. PATENT DOCUMENTS

| | | | |
|---|---|---|---|
| 2011/0063248 A1 | 3/2011 | Yoon | |
| 2011/0080367 A1* | 4/2011 | Marchand | G06F 3/0414 345/174 |
| 2011/0210926 A1* | 9/2011 | Pasquero | G06F 1/1613 345/173 |
| 2012/0287053 A1* | 11/2012 | Bos | G06F 3/04883 345/173 |
| 2014/0168494 A1 | 6/2014 | Hong et al. | |

FOREIGN PATENT DOCUMENTS

| | | |
|---|---|---|
| KR | 10-2011-0028834 A | 3/2011 |
| KR | 10-2012-0129501 A | 11/2012 |
| KR | 10-2014-0076876 A | 6/2014 |

\* cited by examiner

TOUCH RECOGNITION METHOD AND ELECTRONIC DEVICE EXECUTING SAME

CROSS-REFERENCE TO RELATED APPLICATIONS AND CLAIM OF PRIORITY

This application is a 371 National Stage of International Application No. PCT/KR2016/013102 filed Nov. 14, 2016, which claims priority to Korean Patent Application No. 10-2015-0173930 filed Dec. 8, 2015, the disclosures of which are herein incorporated by reference in their entirety.

BACKGROUND

1. Field

Embodiments of the present disclosure described herein relate to a method for recognizing a touch, based on a pressure value of the touch, and to an electronic device for performing the same.

2. Description of Related Art

Various forms of electronic products have been developed and widely used with the development of electronic technologies. Especially, in recent years, portable electronic devices with a touch screen, such as smartphones, tablet PCs, and the like, have become popular.

A touch screen may be classified as a capacitive touch screen, a pressure-sensitive touch screen, or an optical touch screen depending on the way it works. Recently, a capacitive touch screen has been widely used since it can accurately recognize a touch and is less likely to malfunction and a multi-touch is possible. The capacitive touch screen may recognize a touch input, based on a change in the quantity of electric charge of electrodes included in a touch panel.

SUMMARY

A portable electronic device with a touch screen may not always receive power from the outside due to portability and may receive power from an embedded battery while being carried by a user.

Due to the limited power supply, the touch screen (including a touch panel and a touch controller) in the portable electronic device may operate in a low-power mode or a normal mode. For example, the touch screen may operate in the low-power mode while waiting for a user's touch and may operate in the normal mode when a touch is received from the user.

However, the electronic device has a problem in that a mode transition between the low-power mode and the normal mode is frequently delayed to degrade touch responsiveness. Furthermore, the electronic device has a problem in that it consumes more battery power than necessary to compensate for the touch responsiveness.

Aspects of the present disclosure are to address at least the above-mentioned problems and/or disadvantages and to provide at least the advantages described below. Accordingly, an aspect of the present disclosure is to provide a touch recognition method and an electronic device for rapidly performing a mode transition and minimizing power consumption by using a pressure sensor. In addition, another aspect of the present disclosure is to provide a touch recognition method and an electronic device for providing sufficient touch responsiveness despite a user's fast and hard touch input.

In accordance with an aspect of the present disclosure, an electronic device includes a touch panel including a touch sensor, a pressure sensor, and a controller. The controller obtains a pressure value corresponding to a user input through the pressure sensor and switches an operating mode of the touch sensor from a first mode to a second mode when the pressure value satisfies a specified condition.

In accordance with another aspect of the present disclosure, an electronic device includes a processor, a touch panel that receives a touch input, a pressure sensor that detects a pressure value of the touch input, and a controller that transmits touch data corresponding to the touch input to the processor. The controller switches an operating mode of the controller from a first mode to a second mode in response to the touch input when the pressure value of the touch input is higher than or equal to a threshold value, and transmits the touch data to the processor in the second mode.

In accordance with another aspect of the present disclosure, a touch recognition method includes receiving a touch input by a touch panel, detecting a pressure value of the touch input by a pressure sensor, switching an operating mode from a first mode to a second mode by a controller in response to the touch input when the pressure value of the touch input is higher than or equal to a threshold value, and transmitting touch data corresponding to the touch input to a processor by the controller in the second mode.

In accordance with another aspect of the present disclosure, a storage medium is configured to perform an operation of receiving a touch input by a touch panel, an operation of detecting a pressure value of the touch input by a pressure sensor, an operation of switching an operating mode from a first mode to a second mode in response to the touch input by a controller when the pressure value of the touch input is higher than or equal to a threshold value, and an operation of transmitting touch data corresponding to the touch input to the processor in the second mode by the controller.

Other aspects, advantages, and salient features of the disclosure will become apparent to those skilled in the art from the following detailed description, which, taken in conjunction with the annexed drawings, discloses various embodiments of the present disclosure.

According to embodiments of the present disclosure, it is possible to immediately switch between an idle mode and an active mode of a touch screen by using a pressure sensor with high response speed. That is, it is possible to switch between the idle mode and the active mode in real time, based on a pressure value detected by the pressure sensor, thereby improving user-experienced performance, such as response speed, touch responsiveness, and the like. Furthermore, it is possible to dynamically set a report rate of touch data transmitted from a touch controller to a processor in the active mode, depending on the strength of a user's touch, thereby further improving user-experienced performance. In addition, the present disclosure may provide various effects that are directly or indirectly recognized.

DETAILED DESCRIPTION

Figure 1A:
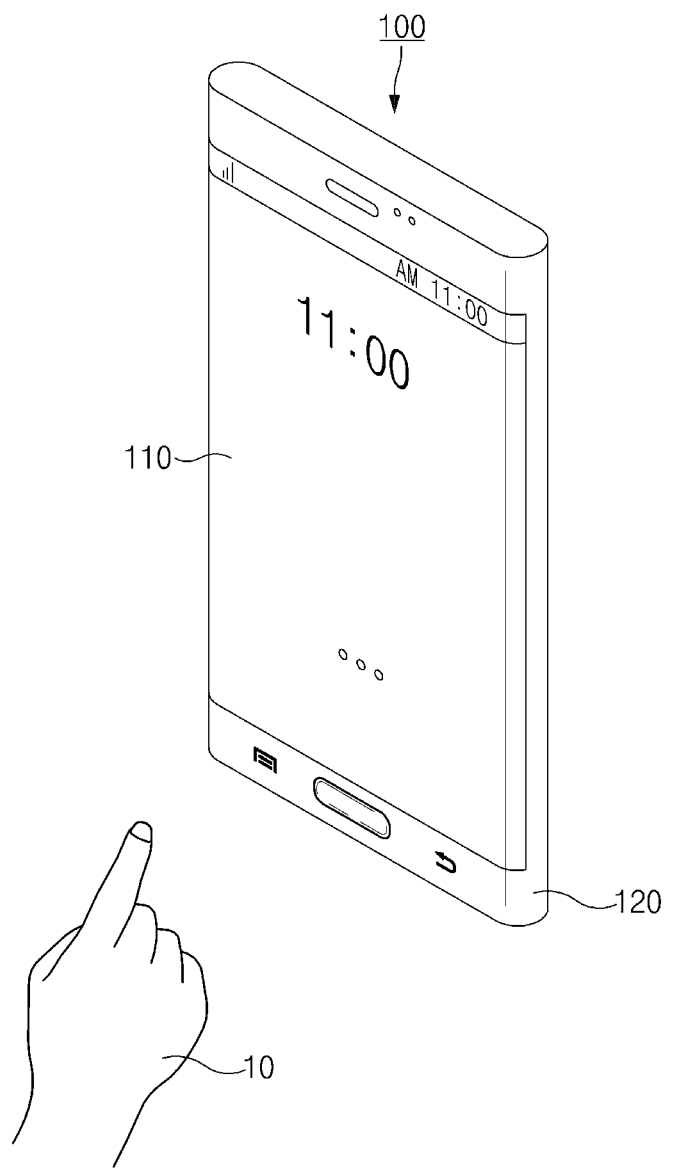
FIGS. 1A and 1B illustrate an electronic device to which various embodiments of the present disclosure are applied.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1A illustrates an electronic device to which various embodiments of the present disclosure are applied.

Referring to FIG. 1A, a perspective view illustrating the exterior of an electronic device 100 is illustrated. The electronic device 100 may include a display 110 and a housing (or case) 120.

According to an embodiment, the display 110 may be disposed on a front surface of the electronic device 100. For example, the display 110 may include a touch panel, a pressure sensor, a display panel, and the like. The display 110 may receive, for example, a touch, gesture, proximity, or hovering input using an electronic pen or a part (e.g., a finger 10) of a user's body.

According to an embodiment, the display 110 may output, for example, various types of contents (e.g., text, images, videos, icons, widgets, symbols, or the like). For example, the user may touch the contents output on the display 110 by using a part (e.g., the finger 10) of his/her body. In response to the touch, the electronic device 100 may perform a functional operation corresponding to the selected contents. A configuration and an operation of the display 110 will be described below in detail with reference to FIG. 1B.

The housing 120 may be formed of plastic, glass, and/or metal to protect various elements included in the electronic device 100 from external shocks or dust. In various embodiments, at least a portion of the housing 120 may be formed of metal.

Figure 1B:
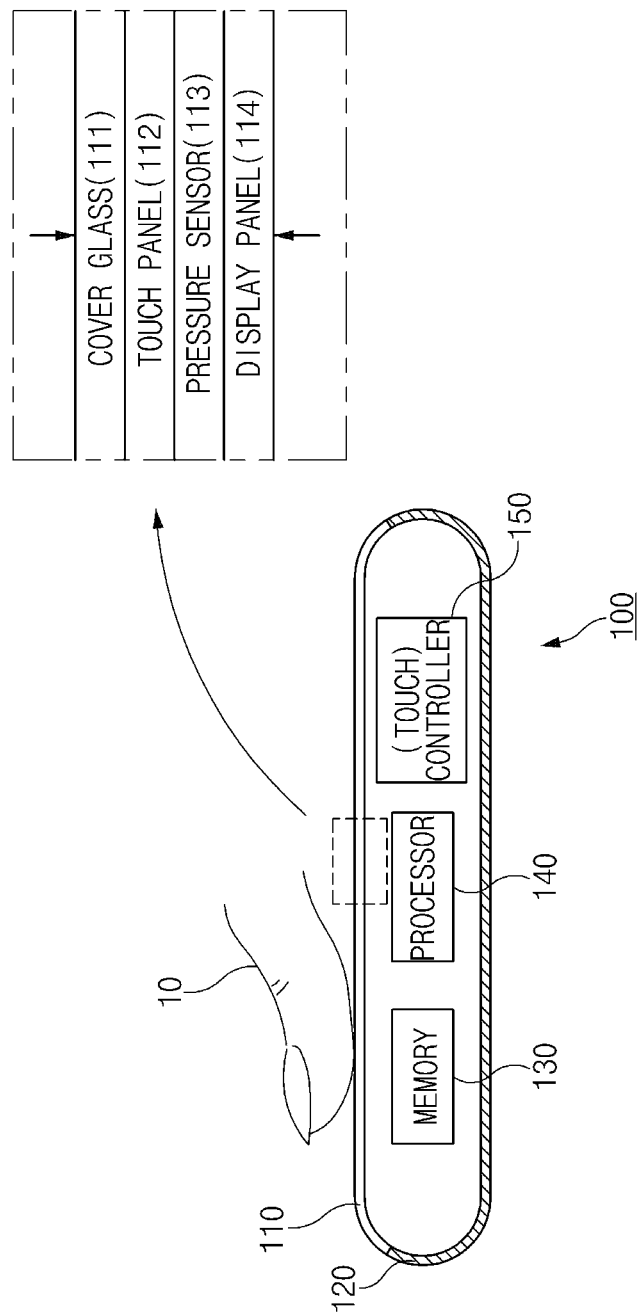

FIG. 1B illustrates a sectional view of the electronic device to which various embodiments of the present disclosure are applied.

Referring to FIG. 1B, a sectional view of the electronic device 100 according to an embodiment is illustrated. For example, FIG. 1B may correspond to a sectional view obtained by horizontally cutting a middle portion of the electronic device 100 illustrated in FIG. 1A. According to an embodiment, the electronic device 100 may include the display 110, the housing 120, a memory 130, a processor 140, a (touch) controller 150. According to various embodiments, the electronic device 100 may further include various modules not illustrated in FIG. 1B. (e.g., see FIG. 12 or 13).

The display 110 may be disposed on, for example, the front surface of the electronic device 100. The display 110 may include, for example, a cover glass 111, a touch panel 112, a pressure sensor 113, and a display panel 114. For example, at least one of the cover glass 111, the touch panel 112, the pressure sensor 113, and the display panel 114 may be attached to another element through an optical clean adhesive (OCA).

The cover glass 111 may pass light generated by the display panel 114. For example, the user may touch the cover glass 111 with a part (e.g., the finger 10) of his/her body to enter a touch input (including an input using an electronic pen). The cover glass 111 may be formed of, for example, reinforced glass, reinforced plastic, a flexible polymer, or the like to protect the display 110 or the electronic device 100 from external shocks.

The touch panel 112 may receive a touch input from the user. For example, when a part (e.g., the finger 10) of the user's body or a stylus touches the touch panel 112, the touch input may be received by detecting a change in the quantity of electric charge on the touch panel 112 (a capacitive touch panel). According to various embodiments, the touch panel 112 may use at least one of pressure-sensitive, infrared, and ultrasonic detecting methods, in addition to the capacitive detecting method.

According to various embodiments, the touch panel 112 may be referred to as various names, such as a touch screen panel (TSP). The touch panel 112 may include a touch sensor capable of detecting the user's touch input. Furthermore, for example, the touch panel 112 may be disposed on the display panel 114 (what is called an On-cell touch panel), or may be included in the display panel 114 (what is called an In-cell touch panel).

The pressure sensor (or "force sensor") 113 may measure the strength of pressure exerted by a touch of the user. For example, the pressure sensor 113 may detect a pressure value of a touch input (or a pressure value corresponding to a user input) received from a part (e.g., the finger 10) of the user's body.

According to an embodiment, the pressure sensor 113 may be included in the touch panel 112. For example, the pressure sensor 113 may be integrated with the touch panel 112, or may be implemented with one or more sensors separate from the touch panel 112.

For example, the pressure sensor 113 may detect pressure exerted by the user's touch input, based on a capacitance change caused by the user's touch input (what is called a capacitive pressure sensor). In another example, the pressure sensor 113 may detect the pressure exerted by the user's touch input, by recognizing a contact area of the touch input. In addition, the pressure sensor 113 may detect the pressure of the touch input in various ways. For example, the pressure sensor 113 may be implemented with a resistive pressure sensor, a piezoelectric pressure sensor, or the like. Furthermore, according to various embodiments, the pressure sensor 113 may be mounted on a portion of a rear surface of the display panel 114 although FIG. 1B illustrates that the pressure sensor 113 is disposed between the touch panel 112 and the display panel 114.

The display panel 114 may output contents (e.g., text, images, videos, icons, widgets, symbols, or the like). The display panel 114 may include, for example, a liquid crystal display (LCD) panel, a light-emitting diode (LED) display panel, an organic LED (OLED) display panel, a microelectromechanical systems (MEMS) display panel, or an electronic paper display panel.

The housing 120 (corresponding to the housing 120 of FIG. 1A) may be formed of plastic, glass, and/or metal to protect various elements in the electronic device 100 from external shocks or dust.

The memory 130 may include, for example, a volatile memory and/or a nonvolatile memory. For example, the memory 130 may store various instructions that, when executed, cause the (touch) controller 150 or the processor 140 to perform operations. In another example, the various instructions may be hardware-coded (or embedded) in the (touch) controller 150 or the processor 140, without being stored in the memory 130. The operations according to the various instructions will be described below.

The processor 140 may include one or more of a central processing unit (CPU), an application processor (AP), and a communication processor (CP). According to an embodiment, the processor 140 may perform operations or data processing associated with control and/or communication of at least one other element of the electronic device 100. For example, the processor 140 may execute a touch driver and may receive an interrupt and/or touch data from the (touch) controller 150 through the touch driver. The processor 140 may receive the touch data as a user input event.

The (touch) controller 150 may receive a touch input and/or a pressure value of the touch input, by controlling the touch panel 112 and/or the pressure sensor 113, or from the touch panel 112 and/or the pressure sensor 113. The (touch) controller 150 may organize touch data, based on the touch input and/or the pressure value of the touch input and may transmit the touch data to the processor 140. According to an embodiment, the (touch) controller 150, before transmitting the touch data, may transmit a specified interrupt to the processor 140. In response to the receipt of the specified interrupt, the processor 140 may establish communication between the processor 140 and the (touch) controller 150 and may receive the touch data through the communication.

According to various embodiments, a frequency at which the (touch) controller 150 transmits the touch data to the processor 140 may be variously referred to as a sensing frequency or a report rate. Furthermore, according to various embodiments, the (touch) controller 150 may be referred to as a touch IC, a touch screen IC, a touch screen controller IC, or a touch controller.

Meanwhile, an implemented form of the (touch) controller 150 is not limited to that illustrated in FIG. 1B. According to various embodiments, in an electronic device not including the (touch) controller 150, the processor 140 may serve the role as the (touch) controller 150. For example, various functional operations that the (touch) controller 150 is capable of performing may be performed by at least a part of the processor 140. Alternatively, the (touch) controller 150 and the processor 140 may be implemented with one element. For example, the (touch) controller 150 and the processor 140 of FIG. 1B may be implemented with one chip. For example, the processor 140 (e.g., an application processor (AP)) may correspond to a system on chip (SoC), and the SoC may be implemented in a form in which a controller for controlling the touch panel 112 and/or the pressure sensor 113 is embedded in the SoC. In this disclosure, in the case where the (touch) controller 150 and the processor 140 are implemented with one element, the corresponding element may be simply referred to as a "processor" or a "controller".

In this case, the processor 140 may be connected to the touch panel 112 and/or the pressure sensor 113 to directly control the touch panel 112 and/or the pressure sensor 113. According to an embodiment, the processor 140 may modify the frequency at which the processor 140 obtains touch data from the touch sensor included in the touch panel 112. For example, the processor 140 may modify the frequency at which the processor 140 obtains touch data from the touch sensor, and may directly obtain the user's touch data through the touch panel 112, based on the modified frequency.

In another example, the processor 140 may variably determine the frequency of touch data to correspond to a pressure value obtained from the pressure sensor 113 and may directly obtain touch data from the touch panel 112 (the touch sensor included therein), depending on the determined frequency.

Meanwhile, according to various embodiments, an element for controlling the touch panel 112 and the pressure sensor 113 may not be limited to the single (touch) controller 150. For example, the touch panel 112 and the pressure sensor 113 may be controlled by independently-implemented controllers, respectively. In this case, the independently-implemented controllers may be operatively connected to the processor 140 as independent elements. For example, the processor 140 may be in communication with the independently-implemented controllers through separate interfaces to change operating modes (e.g., a first mode or a second mode) of the independently-implemented controllers.

As described above, the (touch) controller 150 may be implemented in various forms. However, in this disclosure, the (touch) controller 150 will be described as directly controlling the touch panel 112 and the pressure sensor 113 unless otherwise described (e.g., see FIG. 3A, 3B, or 4).

According to an embodiment, the (touch) controller 150 may operate in the first or second mode. Furthermore, according to various embodiments, the (touch) controller 150 may modify settings for the touch panel 112, depending on the first or second mode. For example, the first mode may correspond to an idle mode (or a standby mode), and the second mode may correspond to an active mode (or an enabled mode). While it has been described in this disclosure that the first mode corresponds to an idle mode and the second mode corresponds to an active mode, the first and second modes are not limited thereto.

According to an embodiment, the touch data may correspond to a touch input received through the touch panel 112. For example, the touch data may include coordinates of the touch input on the touch panel 112 and a pressure value of the touch input. The coordinates of the touch input on the touch panel 112 may be represented as a two-dimensional coordinate (x, y), and the pressure value may be represented as a three-dimensional coordinate (z).

Figure 2A:
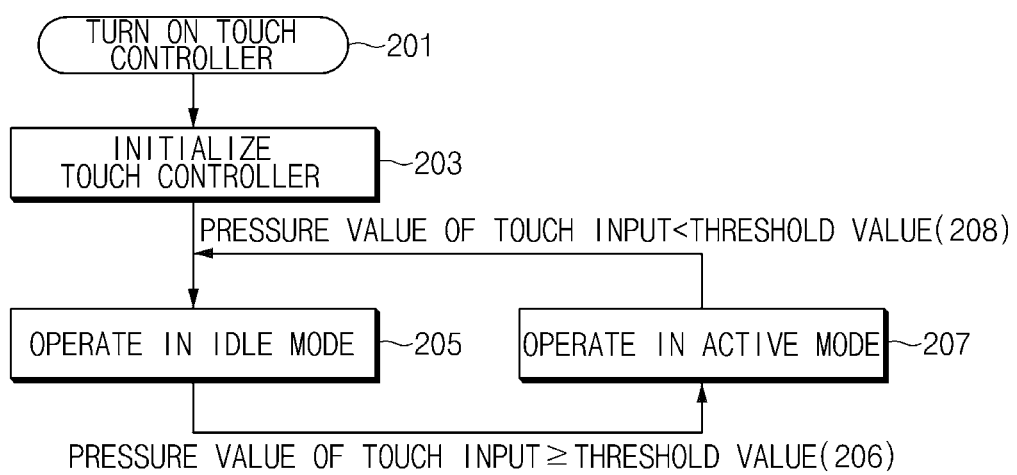
FIGS. 2A and 2B are views for explaining a mode transition of a touch controller according to various embodiments.

FIG. 2A is a view for explaining a mode transition of the touch controller according to an embodiment.

Referring to FIG. 2A, a mode transition flow of the (touch) controller 150 is illustrated. According to various embodiments, an operating mode of the (touch) controller 150 may be understood as an operating mode of the touch sensor included in the touch panel 112. The reference numerals in FIG. 1B will be used in the following description of FIG. 2A.

In operation 201, the (touch) controller 150 may be switched from a turned-off state to a turned-on state under the control of the processor 140. For example, the processor 140 may set power to be supplied to the (touch) controller 150.

In operation 203, the processor 140 may initialize settings of the (touch) controller 150. For example, the processor 140 may control the (touch) controller 150 to perform coordinate calibration of the touch panel 112. For example, the processor 140 may establish and/or activate a communication channel (e.g., I²C SPI, SMBus, UART, USB, or the like) with the (touch) controller 150.

In operation 205, the (touch) controller 150 may operate in an idle mode (a first mode). For example, in the idle mode, the (touch) controller 150 may scan whether a touch input is received by the touch panel 112, with low sensing sensitivity (first sensing sensitivity) or low sensing power (first sensing power).

According to an embodiment, the (touch) controller 150 may remain in the idle mode without generating touch data when no touch input is received in the idle mode. According to another embodiment, the (touch) controller 150 may remain in the idle mode without generating touch data even when a pressure value of a touch input detected through the pressure sensor 113 is lower than a threshold value.

According to various embodiments, when the pressure value of the touch input detected through pressure sensor 113 is lower than the threshold value while the (touch) controller 150 is in the idle mode, the (touch) controller 150 may transmit touch data to the processor 140 at a first frequency (or report rate) that is relatively low.

In operation 206, when the pressure value of the touch input detected through the pressure sensor 113 is higher than or equal to the threshold value, the (touch) controller may switch the operating mode from the idle mode to an active mode in response to the touch input.

In operation 207, the (touch) controller 150 may scan a touch input on the touch panel 112 with high sensing sensitivity (second sensing sensitivity) or high sensing power (second sensing power) in the active mode. According to an embodiment, the (touch) controller 150 may correct or process a sensing signal of the touch panel 112 that corresponds to the touch input, by using various filters. According to various embodiments, the (touch) controller 150 may determine whether the touch input is an available touch input, or whether the touch input is an unavailable touch input (e.g., a ghost touch), based on the sensing signal corresponding to the touch input.

According to an embodiment, the (touch) controller 150 may transmit touch data corresponding to the touch input to the processor 140. According to various embodiments, in the active mode, the (touch) controller 150 may consume more current (or power) than in the idle mode.

According to an embodiment, the (touch) controller 150 may transmit the touch data to the processor 140 at a specified frequency (a second frequency). For example, the specified frequency (the second frequency) may be higher than the first frequency.

According to various embodiments, the specified frequency (the second frequency) may be variably set depending on a pressure value of the touch input. For example the specified frequency (the second frequency) may be set to rise with an increase in the pressure value of the touch input.

In operation 208, the (touch) controller 150 may immediately switch the operating mode from the active mode to an idle mode in response to a reduction in the pressure value of the touch input on the touch panel 112 to below the threshold value (e.g., when the touch input ceases to exist).

Figure 2B:
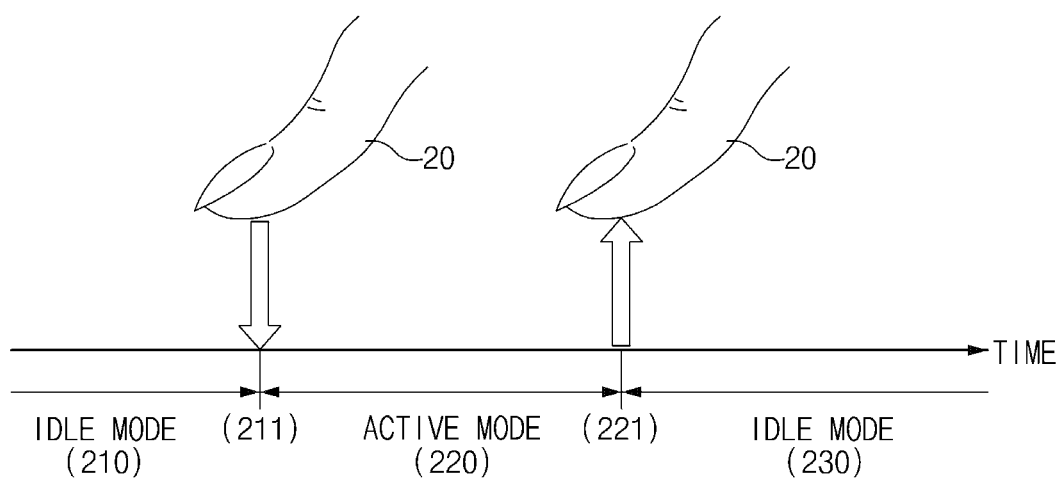

FIG. 2B is a view for explaining a mode transition of the touch controller according to an embodiment.

Referring to FIG. 2B, the (touch) controller 150 of the electronic device 100 may operate in an idle mode 210 while no touch input is received by the touch panel 112 (or in the case where a pressure value of a touch input is lower than a threshold value).

For example, when a user's finger 20 touches the display 110 (see reference numeral 221), the touch panel 112 may receive a touch input in response to the touch, and the pressure sensor 113 may detect a pressure value of the touch input. The (touch) controller 150 may switch the operating mode from the idle mode 210 to an active mode 220 when the pressure value of the touch input is higher than or equal to the threshold value.

Thereafter, for example, the user may move the finger 20 over the display 110 and then release the touch (see reference numeral 221). For example, the (touch) controller 150 operating in the active mode 220 may receive a touch input in response to the touch-down and the touch movement. Furthermore, in response to the release of the touch, the (touch) controller 150 may immediately switch the operating mode from the active mode 220 to an idle mode 230 when a pressure value of the touch input is lower than the threshold value (see reference numeral 221).

Figure 3A:
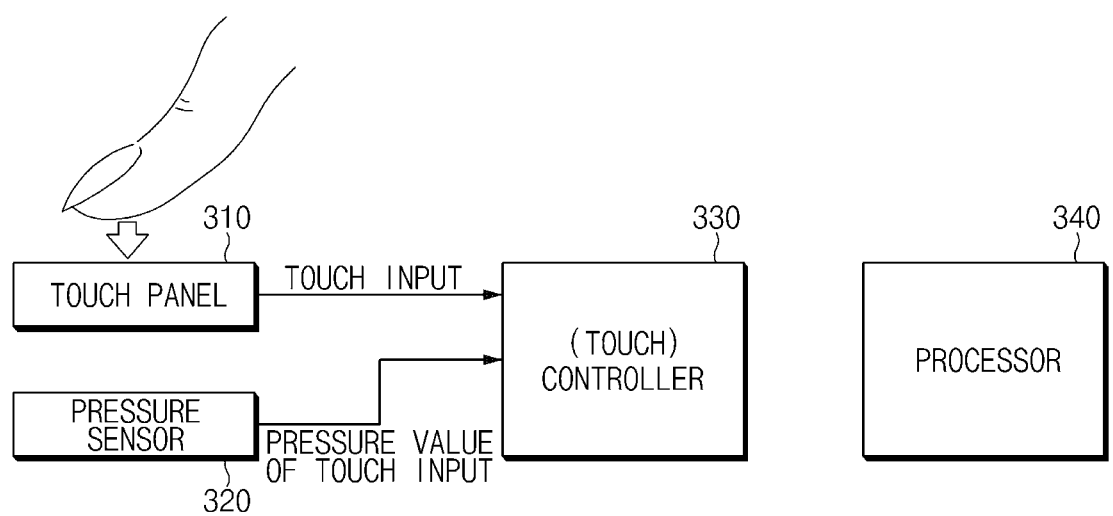
FIGS. 3A and 3B are views for explaining idle modes according to various embodiments.

FIG. 3A is a view for explaining an idle mode according to an embodiment.

Referring to FIG. 3A, an electronic device may include a touch panel 310, a pressure sensor 320, a (touch) controller 330, and a processor 340. According to various embodiments, the controller 330 and the processor 340 may be implemented with one element. Since the touch panel 310, the pressure sensor 320, the (touch) controller 330, and the processor 340 correspond to the touch panel 112, the pressure sensor 113, the (touch) controller 150, and the processor 140 illustrated in FIG. 1B, respectively, repetitive descriptions thereof will be omitted.

According to an embodiment, the (touch) controller 330 may operate in an idle mode (a first mode). For example, in the idle mode, the (touch) controller 330 may scan whether a touch input is received by the touch panel 310, with low sensing sensitivity (first sensing sensitivity) or low sensing power (first sensing power).

For example, when the touch panel 310 receives a touch input, the pressure sensor 320 may detect a pressure value of the touch input. The touch input and the pressure value of the touch input may be provided to the (touch) controller 330. For example, when the detected pressure value of the touch input is lower than a threshold value, the (touch) controller 330 may remain in the idle mode as it is, without generating touch data. Meanwhile, when no touch input is received in the idle mode, the (touch) controller 330 may remain in the idle mode without generating touch data.

According to various embodiments, the touch panel 310 and the pressure sensor 320 may be controlled by separate controllers, and operating modes of the respective controllers may be changed by the processor 340. In this case, when the pressure value of the touch input detected through the pressure sensor 320 is lower than the threshold value, the processor 340 may remain in the idle mode as it is, without obtaining touch data from the touch panel 310 and the pressure sensor 320.

Furthermore, according to various embodiments, the touch panel 310 (a touch sensor included therein) and the pressure sensor 320 may be directly controlled by the processor 340. In this case, when the pressure value of the touch input detected through the pressure sensor 320 is lower than the threshold value, the processor 340 may remain in the idle mode as it is, without obtaining touch data from the touch panel 310 and/or the pressure sensor 320.

Figure 3B:
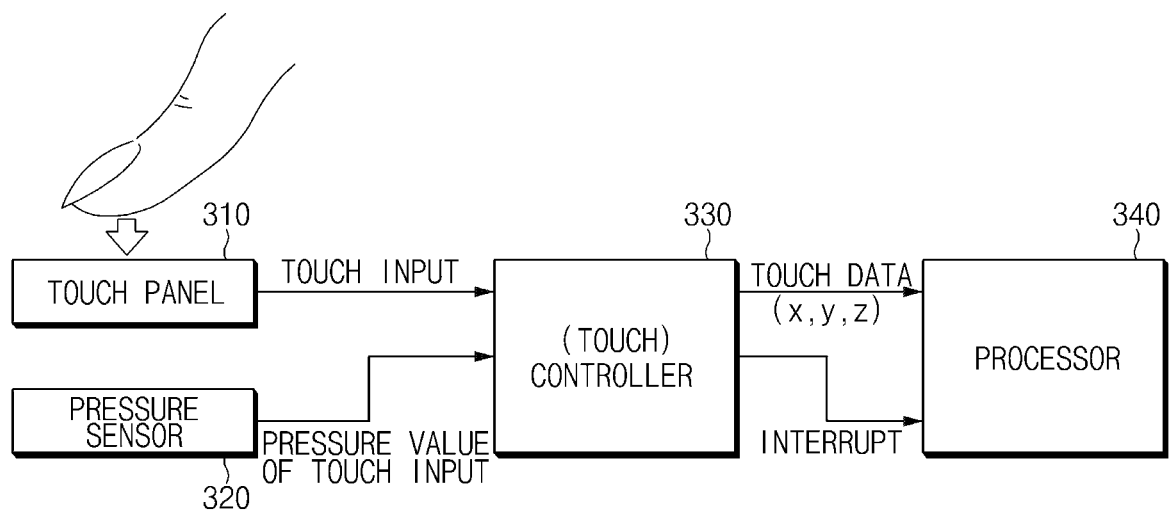

FIG. 3B is a view for explaining an idle mode according to another embodiment.

Referring to FIG. 3B, the (touch) controller 330 may operate in an idle mode (a first mode). For example, in the idle mode, the (touch) controller 330 may scan whether a touch input is received by the touch panel 310, with first sensing sensitivity or first sensing power, as in FIG. 3A.

For example, when the touch panel 310 receives a touch input in the idle mode, the pressure sensor 320 may detect a pressure value of the touch input. The touch input and the pressure value of the touch input may be provided to the (touch) controller 330. The (touch) controller 330 may transmit a specified interrupt to the processor 340 when the detected pressure value of the touch input is lower than a threshold value. In response to the receipt of the specified interrupt, the processor 340 may activate a communication connection (e.g., I²C) between the (touch) controller 330 and the processor 340. When the communication connection is activated, the (touch) controller 330 may transmit touch data (x, y, z) to the processor 340 at a relatively low frequency (a first frequency, that is, a report rate of the (touch) controller 330 in the idle mode).

According to various embodiments, the touch data (x, y, z) may include, for example, the coordinate (x, y) of the touch input on the touch panel 310 and the pressure value (z) of the touch input detected by the pressure sensor 320 as parameters. Furthermore, the frequency at which the touch data (x, y, z) is transmitted to the processor 340 may range, for example, from 30 Hz to 40 Hz.

According to various embodiments, the touch panel 310 and the pressure sensor 320 may be controlled by separate controllers, and operating modes of the respective controllers may be changed by the processor 340. In this case, when the pressure value of the touch input detected through the pressure sensor 320 is lower than the threshold value, the processor 340 may obtain the touch data from the touch panel 310 and/or the pressure sensor 320 at a relatively low frequency (the first frequency).

Furthermore, according to various embodiments, the touch panel 310 (the touch sensor included therein) and the pressure sensor 320 may be directly controlled by the processor 340. In this case, when the pressure value of the touch input detected through the pressure sensor 320 is lower than the threshold value, the processor 340 may obtain the touch data from the touch panel 310 and/or the pressure sensor 320 at a relatively low frequency (the first frequency).

The (touch) controller 330 operating in the idle mode has been described with reference to FIGS. 3A and 3B. For example, when the pressure value of the touch input detected by the pressure sensor 320 is higher than or equal to the threshold value while the (touch) controller 330 is in the idle mode, the (touch) controller 330 may switch the operating mode from the idle mode to an active mode.

Figure 4:
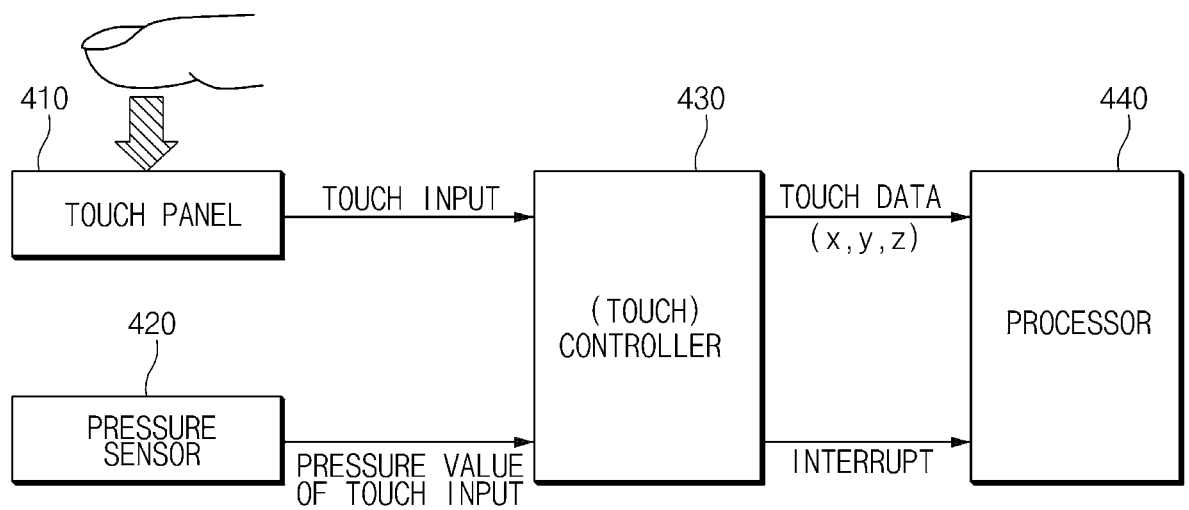
FIG. 4 is a view for explaining an active mode according to an embodiment.

FIG. 4 is a view for explaining an active mode according to an embodiment.

Referring to FIG. 4, an electronic device may include a touch panel 410, a pressure sensor 420, a (touch) controller 430, and a processor 440. Since the touch panel 410, the pressure sensor 420, the (touch) controller 430, and the processor 440 correspond to the touch panel 310, the pressure sensor 320, the (touch) controller 330, and the processor 340 illustrated in FIG. 3, respectively, repetitive descriptions thereof will be omitted.

According to an embodiment, the (touch) controller 430 may operate in an active mode (a second mode). For example, in the active mode, the (touch) controller 430 may scan whether a touch input is received by the touch panel 410, with second sensing sensitivity higher than the first sensing sensitivity or second sensing power higher than the first sensing power.

For example, when the touch panel 410 receives a touch input, the pressure sensor 420 may detect a pressure value of the touch input. The touch input and the pressure value of the touch input may be provided to the (touch) controller 430. For example, when the detected pressure value of the touch input is higher than or equal to a threshold value, the (touch) controller 430 may transmit a specified interrupt to the processor 440 and then transmit touch data (x, y, z) to the processor 440 at a second frequency higher than the first frequency. For example, the frequency at which the touch data (x, y, z) is transmitted to the processor 440 may range, for example, from 60 Hz to 200 Hz.

According to an embodiment, the second frequency (that is, a report rate of the (touch) controller 430 in the active mode) may be variably set depending on the pressure value of the touch input detected by the pressure sensor 420. For example, the second frequency may be set to rise with an increase in the pressure value of the touch input.

According to various embodiments, the touch panel 410 and the pressure sensor 420 may be controlled by separate controllers, and operating modes of the respective controllers may be changed by the processor 440. In this case, when the pressure value of the touch input detected through the pressure sensor 420 is higher than or equal to the threshold value, the processor 440 may obtain the touch data from the touch panel 410 and/or the pressure sensor 420 at a relatively high frequency (the second frequency).

Furthermore, according to various embodiments, the touch panel 410 (a touch sensor included therein) and the pressure sensor 420 may be directly controlled by the processor 440. In this case, when the pressure value of the touch input detected through the pressure sensor 420 is higher than or equal to the threshold value, the processor 440 may obtain the touch data from the touch panel 410 and/or the pressure sensor 420 at a relatively high frequency (the second frequency).

Figure 5A:
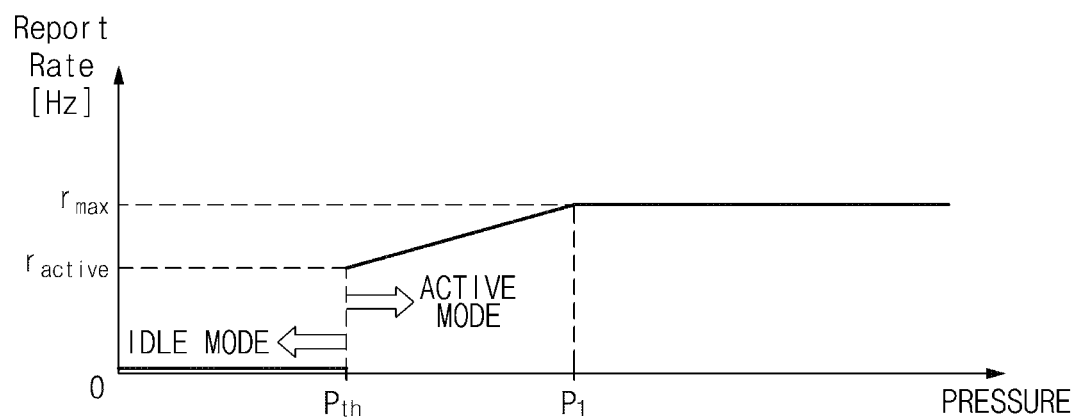
FIGS. 5A and 5B illustrate a report rate of a touch controller depending on a pressure value in connection with an operation of an electronic device according to an embodiment.

FIG. 5A illustrates a report rate of a touch controller depending on a pressure value in connection with an operation of an electronic device according to an embodiment.

Referring to FIG. 5A, a graph depicting a report rate of a touch controller depending on a pressure value of a touch input is illustrated. For example, the graph of FIG. 5A depicts a report rate of the touch controller that operates in the idle mode described with reference to FIG. 3A and the active mode described with reference to FIG. 4. The reference numerals in FIG. 1B will be used in the following description of FIG. 5A.

For example, when a touch input is received through the touch panel 112, the pressure sensor 113 may detect a pressure value of the touch input. The (touch) controller 150 may operate in an idle mode when the detected pressure value is lower than a threshold value $P_{th}$. In the idle mode, the (touch) controller 150 may not transmit touch data corresponding to the touch input to the processor 140. Accordingly, a report rate may substantially correspond to "0" when the pressure value of the touch input is lower than the threshold value $P_{th}$.

The (touch) controller 150 may immediately switch to an active mode when the pressure value of the touch input is higher than the threshold value $P_{th}$. For example, in the active mode, the (touch) controller 150 may transmit touch data corresponding to the touch input to the processor 140. For example, when the pressure value of the touch input corresponds to the threshold value $P_{th}$, the (touch) controller 150 may transmit the touch data to the processor 140 at a report rate of $r_{active}$ (e.g., 60 Hz).

According to an embodiment, in the pressure range between the threshold value $P_{th}$ and a specified pressure value $P_1$, a report rate may be set to rise with an increase in the pressure value of the touch input. For example, in the pressure range between $P_{th}$ and $P_1$, the report rate may be set to rise as a user touches the display 110 harder.

According to an embodiment, at a pressure value higher than the specified pressure value $P_1$, the (touch) controller 150 may transmit the touch data to the processor 140 at the maximum report rate $r_{max}$ (e.g., 200 Hz). In other words, when the pressure value detected by the pressure sensor 113 exceeds the specified pressure value $P_1$, the report rate may be saturated to the maximum report rate $r_{max}$ (e.g., 200 Hz).

Figure 5B:
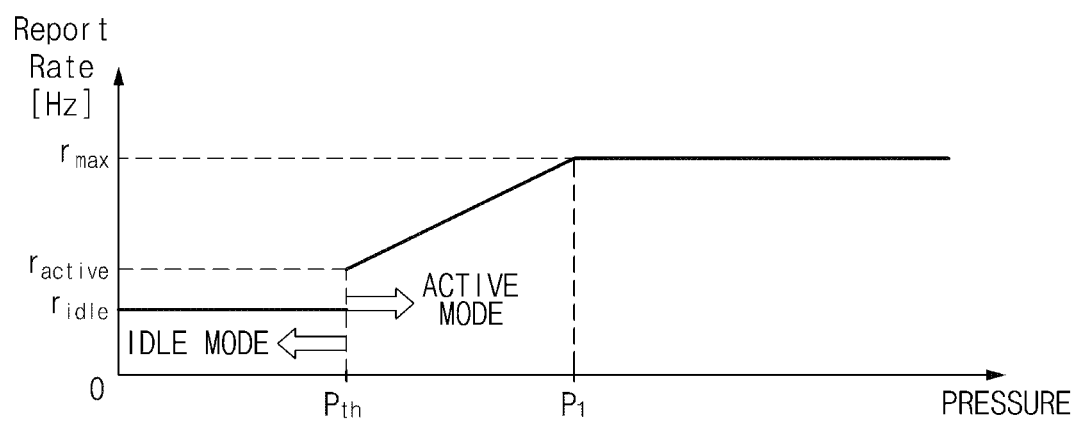

FIG. 5B illustrates a report rate of a touch controller depending on a pressure value in connection with an operation of an electronic device according to another embodiment.

Referring to FIG. 5B, a graph depicting a report rate of a touch controller depending on a pressure value of a touch input is illustrated. For example, the graph of FIG. 5B depicts a report rate of the touch controller that operates in the idle mode described with reference to FIG. 3A and the active mode described with reference to FIG. 4. The reference numerals in FIG. 1B will be used in the following description of FIG. 5B.

For example, when a touch input is received through the touch panel 112, the pressure sensor 113 may detect a pressure value of the touch input. The (touch) controller 150 may operate in an idle mode when the detected pressure value is lower than a threshold value $P_{th}$. In the idle mode, the (touch) controller 150 may transmit touch data corresponding to the touch input to the processor 140 at a first report rate $r_{idle}$ (e.g., 30 to 40 Hz).

The (touch) controller 150 may immediately switch to an active mode when the pressure value of the touch input is higher than the threshold value $P_{th}$. For example, when the pressure value of the touch input corresponds to the threshold value $P_{th}$, the (touch) controller 150 may transmit the touch data to the processor 140 at a second report rate $r_{active}$ (e.g., 60 Hz).

According to an embodiment, in the pressure range between the threshold value $P_{th}$ and a specified pressure value $P_1$, a report rate may be set to rise with an increase in the pressure value of the touch input. For example, in the pressure range between $P_{th}$ and $P_1$, the report rate may be set to rise as a user touches the display 110 harder.

According to an embodiment, at a pressure value higher than the specified pressure value $P_1$, the (touch) controller 150 may transmit the touch data to the processor 140 at the maximum report rate $r_{max}$ (e.g., 200 Hz). When the pressure value detected by the pressure sensor 113 exceeds the specified pressure value $P_1$, the report rate may be saturated to the maximum report rate $r_{max}$ (e.g., 200 Hz).

Figure 6:
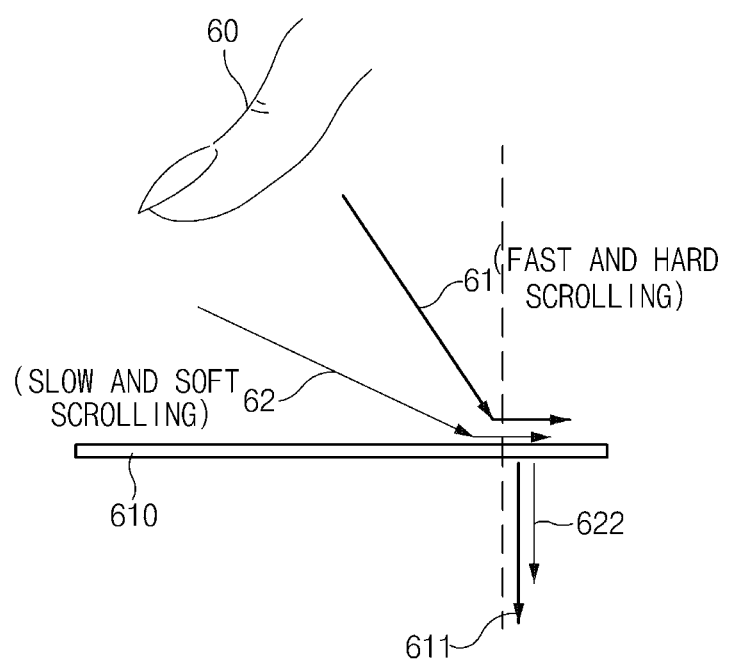
FIG. 6 is a view for explaining a variably-set report rate according to an embodiment of the present disclosure.

FIG. 6 is a view for explaining a variably-set report rate according to an embodiment of the present disclosure.

Referring to FIG. 6, a user may perform scrolling 61 and 62 on a display 610 by using a finger 60. The scrolling 61 and 62 may include, for example, touch-down, touch movement, and touch release. In FIG. 6, it is assumed that pressure values of touch inputs based on the scrolling 61 and 62 are higher than the aforementioned threshold value. That is, it is assumed that a touch controller of an electronic device including the display 610 operates in an active mode.

According to an embodiment, the user may perform the fast and hard scrolling 61 by using the finger 60. A pressure sensor embedded in the display 610 may detect a high pressure value 611 caused by the scrolling 61. For example, the touch controller may set a high report rate corresponding to the high pressure value 611 and may transmit touch data corresponding to the scrolling 611 to a processor at the set high report rate.

For example, in the case of the fast and hard scrolling 61, the touch controller has to set the report rate to 90 Hz to 100 Hz to transmit the touch data to the processor without loss. That is because touch contact time and a touch distance are short in the case of the fast and hard scrolling 61.

According to another embodiment, the user may perform the slow and soft scrolling 62 by using the finger 60. The pressure sensor embedded in the display 610 may detect a relatively low pressure value 622 (lower than the pressure value 611) caused by the scrolling 62. For example, the touch controller may set a report rate corresponding to the pressure value 622 (lower than the report rate corresponding to the pressure value 611) and may transmit touch data corresponding to the scrolling 62 to the processor at the set report rate.

For example, in the case of the scrolling 62, the touch controller has to set the report rate to 60 Hz or higher to transmit the touch data to the processor without loss.

Figure 7A:
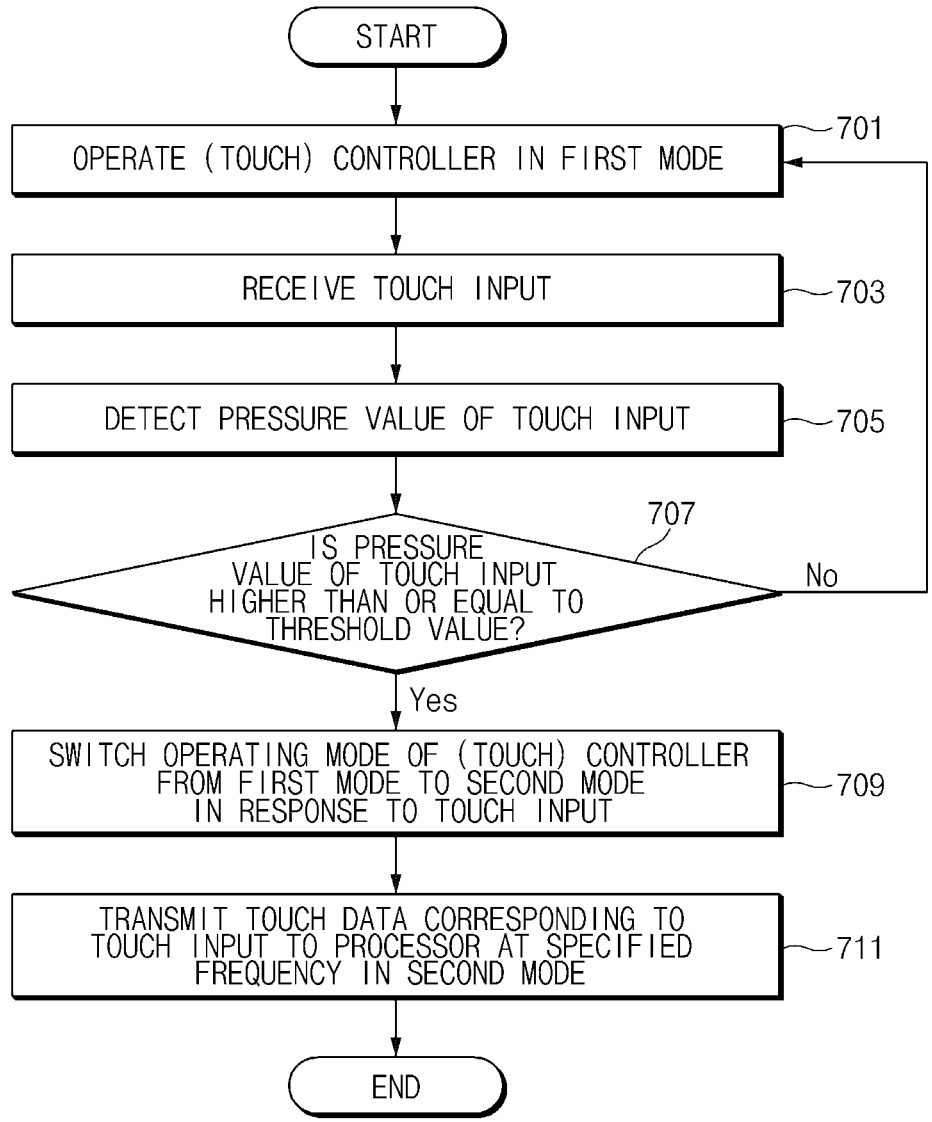
FIG. 7A is a flowchart illustrating a touch recognition method according to an embodiment.

FIG. 7A is a flowchart illustrating a touch recognition method according to an embodiment.

Referring to FIG. 7A, a touch recognition method according to an embodiment may include operations 701 to 711. Operations 701 to 711 may be performed by, for example, the electronic device 100 illustrated in FIGS. 1A and 1B. The reference numbers in FIG. 1B will be used in the following description of operations 701 to 711.

In operation 701, the (touch) controller 150 may operate in a first mode (e.g., an idle mode).

In operation 703, the touch panel 112 may receive a touch input from a user. The touch input may be transmitted to the (touch) controller 150.

In operation 705, the pressure sensor 113 may detect a pressure value of the touch input. The detected pressure value may be transmitted to the (touch) controller 150. According to an embodiment, the pressure sensor 113 and the touch panel 112 may be implemented with separate modules, respectively. In this case, the pressure sensor 113 may directly detect pressure exerted by the user except through the touch panel 112. For example, the pressure sensor 113 may be disposed in a physical button on the housing 120 of the electronic device 100, on the periphery of the display 110, in a home key of the electronic device, or the like. The pressure sensor 113 disposed at various positions may detect pressure without the intervention of the touch panel 112.

In operation 707, the (touch) controller 150 may determine whether the pressure value of the touch input is higher than or equal to a threshold value. The (touch) controller 150 may proceed to operation 709 when the pressure value is higher than or equal to the threshold value ("Yes" in operation 707) and may repeat operations 701 to 705 if not ("No" in operation 707).

In operation 709, the (touch) controller 150 may immediately switch the operating mode from the first mode (e.g., the idle mode) to a second mode (e.g., an active mode) in response to the touch input.

Meanwhile, according to various embodiments, in operation 705, the pressure sensor 113 may directly transmit the detected pressure value to the processor 140. Accordingly, in operation 707, the processor 140 may determine whether the pressure value of the touch input is higher than or equal to the threshold value. The processor 140 may proceed to operation 709 when the pressure value is higher than or equal to the threshold value ("Yes" in operation 707) and may repeat operations 701 to 705 if not ("No" in operation 707). In operation 709, the processor 140 may interchange operating modes (e.g., the first mode (idle mode) and the second mode (active mode)) of the (touch) controller 150 in response to the touch input. In other words, the processor 140 may control the operating mode (e.g., the first mode or the second mode) of the (touch) controller 150, based on the magnitude of the detected pressure value.

In operation 711, the (touch) controller 150 may transmit touch data corresponding to the touch input to the processor 140 at a specified frequency (e.g., 60 Hz to 200 Hz) in the second mode. The touch data may include, for example, coordinates of the touch input on the touch panel 112 and the pressure value of the touch input as parameters.

According to an embodiment, the specified frequency may be variably set depending on the pressure value of the touch input detected in operation 705. For example the specified frequency may be set to rise with an increase in the pressure value of the touch input.

According to another embodiment, the (touch) controller 150, before transmitting the touch data, may transmit a specified interrupt to the processor 140. In response to the receipt of the specified interrupt, the processor 140 may receive the touch data transmitted by the (touch) controller 150.

According to another embodiment, after operation 711, the (touch) controller 150 may switch the operating mode back to the first mode in response to a reduction in the pressure value of the touch input detected by the pressure sensor 113 to below the threshold value.

Figure 7B:
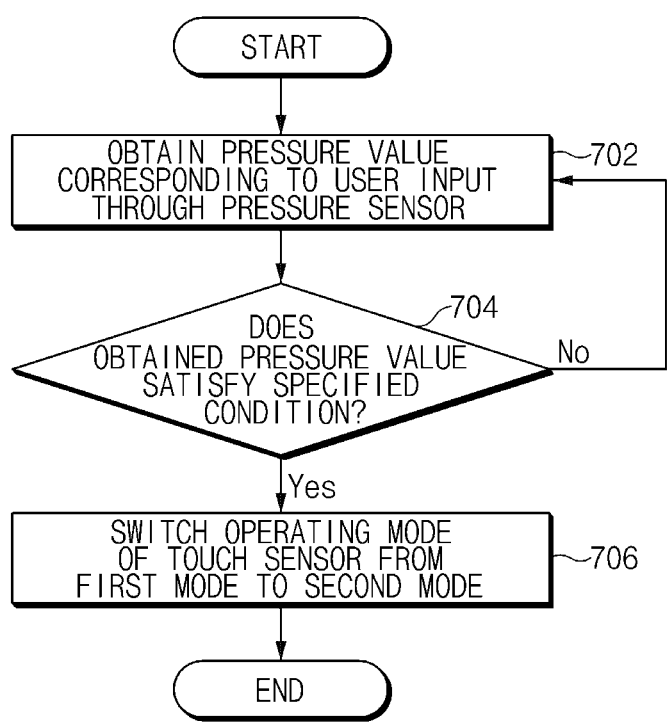
FIG. 7B is a flowchart illustrating a touch recognition method according to another embodiment.

FIG. 7B is a flowchart illustrating a touch recognition method according to another embodiment.

Referring to FIG. 7B, a touch recognition method according to an embodiment may include operations 702 to 706. An electronic device that performs operations 702 to 706 may not include, for example, the (touch) controller 150 illustrated in FIG. 1B. In this case, for example, the processor 140 in the electronic device may serve the role as the (touch) controller 150. In another example, the (touch) controller 150 and the processor 140 may be implemented with one element. For example, the (touch) controller 150 and the processor 140 of FIG. 1B may be implemented with one chip.

The operations in FIG. 7B may be performed by a "processor" that serves the role as the (touch) controller 150 or by a "processor" in which the (touch) controller 150 and the processor 140 are implemented with one element. According to various embodiments, the "processor" that performs the operations in FIG. 7B may be simply referred to as a "controller". Elements other than the "processor" will be described by using the reference numerals in FIGS. 1A and 1B.

In operation 702, the processor may directly obtain a pressure value corresponding to a user input through the pressure sensor 113. According to various embodiments, the pressure sensor 113 may be controlled by an independent controller that is distinguished from the processor. In this case, the processor may obtain the pressure value through the controller that controls the pressure sensor 113.

In operation 704, the processor may determine whether the pressure value satisfies a specified condition. For example, the processor may determine whether the pressure value is higher than or equal to a threshold value. The processor may proceed to operation 706 when the pressure value is higher than or equal to the threshold value ("Yes" in operation 704) and may repeat operation 702 if not ("No" in operation 704).

In operation 706, in response to the user input, the processor may switch the operating mode of the touch sensor included in the touch panel 112 from a first mode (e.g., an idle mode) to a second mode (e.g., an active mode) since the pressure value is higher than or equal to the threshold value.

According to an embodiment, in the second mode (in which the pressure value is higher than or equal to the threshold value), the processor may obtain touch data corresponding to the user input at a second frequency through the touch sensor included in the touch panel 112. In this case, the second frequency (the specified frequency) may be variably set depending on the pressure value obtained from the pressure sensor 113. For example, the second frequency may be set to rise with an increase in the pressure value.

According to an embodiment, in the first mode (in which the pressure value is lower than the threshold value), the processor may obtain touch data corresponding to the user input at a first frequency through the touch sensor included in the touch panel 112. In this case, the first frequency may be lower than the second frequency. In some embodiments, the processor may not obtain touch data corresponding to the user input in the first mode (in which the pressure value is lower than the threshold value).

According to various embodiments, the processor may switch the operating mode from the first mode to the second mode when the pressure value increases to the threshold value or higher while the processor is in the first mode. In contrast, the processor may switch the operating mode of the touch sensor from the first mode to the second mode in response to a reduction in the pressure value to below the threshold value while the processor is in the second mode.

Figure 8:
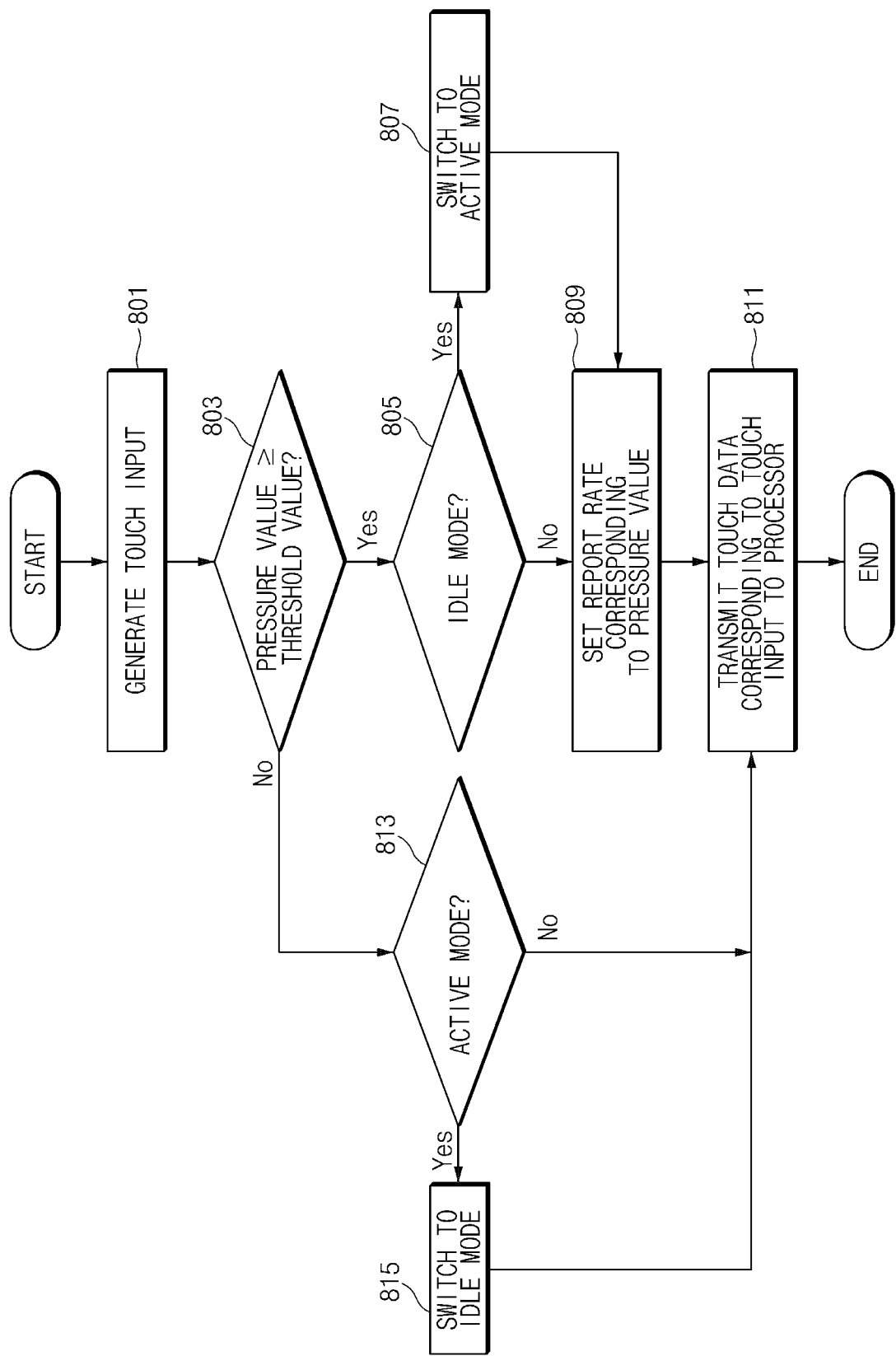
FIG. 8 is a flowchart illustrating a touch recognition method according to an embodiment.

FIG. 8 is a flowchart illustrating a touch recognition method according to another embodiment.

Referring to FIG. 8, a touch recognition method according to an embodiment may include operations 801 to 811. Operations 801 to 811 may be performed by, for example, the electronic device 100 illustrated in FIGS. 1A and 1B. Operations 801 to 811 of FIG. 8 may correspond to a flowchart in which the operations in FIG. 7A are differently represented. The reference numbers in FIG. 1B will be used in the following description of operations 801 to 811.

In operation 801, a touch input may be generated by a user. For example, the touch input may be detected by the touch panel 112 and may be transmitted to the (touch) controller 150. Furthermore, for example, a pressure value of the touch input may be detected by the pressure sensor 113 and may be transmitted to the (touch) controller 150.

In operation 803, the (touch) controller 150 may determine whether the pressure value of the touch input is higher than or equal to a threshold value. The (touch) controller 150 may proceed to operation 805 when the pressure value is higher than or equal to the threshold value ("Yes" in operation 803) and may proceed to operation 813 if not ("No" in operation 803).

In operation 805, the (touch) controller 150 may determine whether the operating mode thereof is an idle mode. The (touch) controller 150 may proceed to operation 807 when it is determined that the operating mode thereof is an idle mode ("Yes" in operation 805) and may proceed to operation 809 if not, that is, when it is determined that the operating mode thereof is an active mode ("No" in operation 805).

In operation 807, the (touch) controller 150 may switch from the idle mode to an active mode since the operating mode thereof is determined to be an idle mode. Thereafter, the (touch) controller 150 may perform operation 809.

In operation 809, the (touch) controller 150 may set a report rate corresponding to the pressure value of the touch input generated in operation 801 since the (touch) controller 150 has switched to the active mode through operations 805 and 807.

In operation 811, the (touch) controller 150 may transmit, to the processor 140, touch data corresponding to the touch input generated in operation 801. According to an embodiment, when operation 811 is performed subsequent to operation 809, the (touch) controller 150 may transmit the touch data to the processor 140 at the report rate set in operation 809 (see FIG. 4).

Meanwhile, when it is determined that the pressure value of the touch input generated in operation 801 is lower than the threshold value ("No" in operation 803), the (touch) controller 150 may, in operation 813, determine whether the operating mode thereof is an active mode. The (touch) controller 150 may proceed to operation 815 when it is determined that the operating mode thereof is an active mode ("Yes" in operation 813) and may proceed to operation 811 if not, that is, when it is determined that the operating mode thereof is an idle mode ("No" in operation 813).

In operation 815, the (touch) controller 150 may switch from the active mode to an idle mode since the operating mode thereof is determined to be an active mode. Thereafter, the (touch) controller 150 may perform operation 811.

When operation 811 is performed subsequent to operation 813 or 815, the (touch) controller 150 may transmit the touch data to the processor 140 at a report rate specified in advance (e.g., 30 Hz to 40 Hz) (see FIG. 3b).

Figure 9:
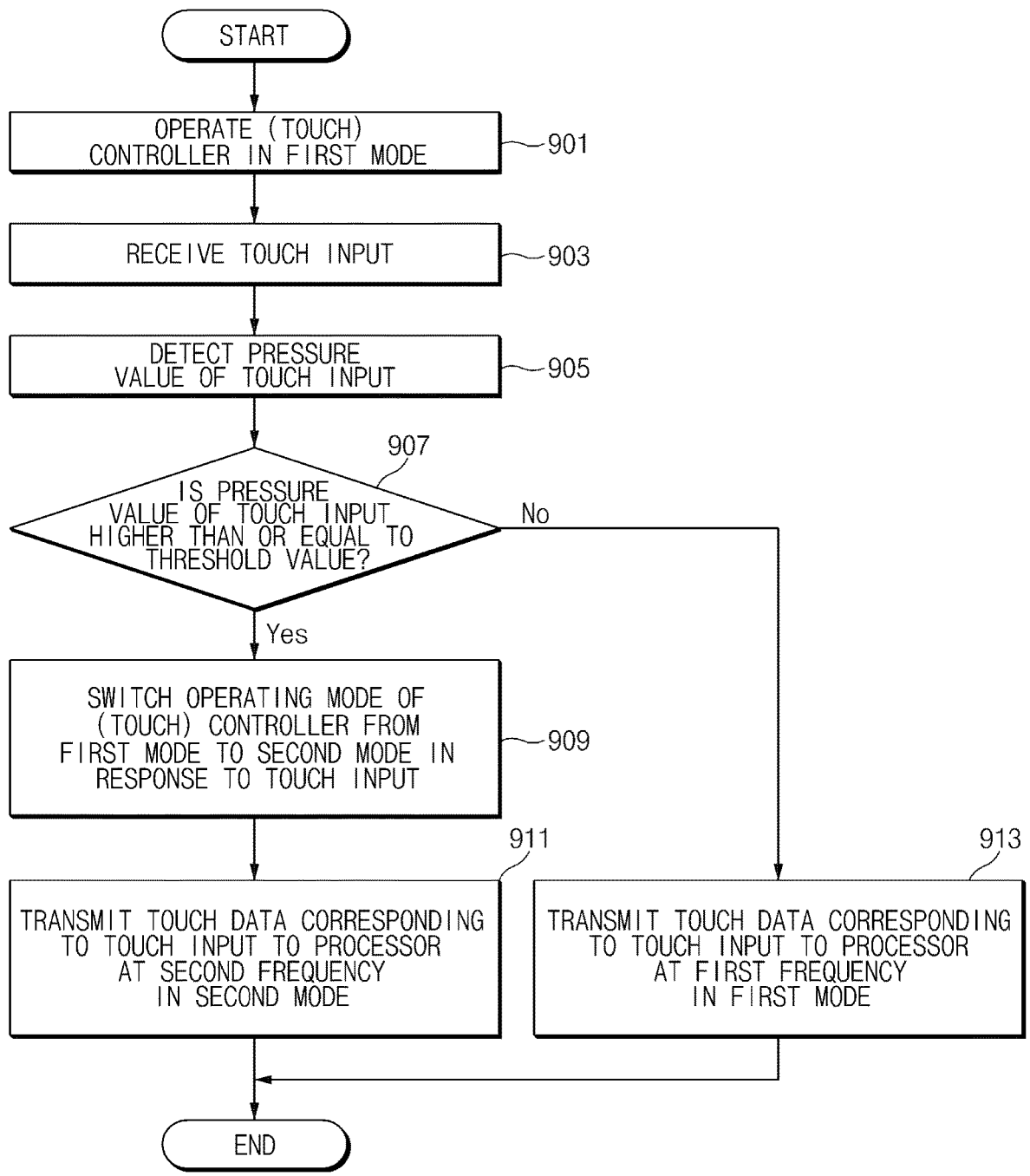
FIG. 9 is a flowchart illustrating a touch recognition method according to various embodiment.

FIG. 9 is a flowchart illustrating a touch recognition method according to another embodiment.

Referring to FIG. 9, a touch recognition method according to an embodiment may include operations 901 to 913. Since operation 901 to 907 correspond to operation 701 to 707 of FIG. 7, repetitive descriptions thereof will be omitted. The reference numbers in FIG. 1B will be used in the following description of operations 909 to 913.

In operation 909, the (touch) controller 150 may immediately switch the operating mode thereof from a first mode (e.g., an idle mode) to a second mode (e.g., an active mode) in response to a touch input since a pressure value of the touch input is determined to be higher than or equal to a threshold value ("Yes" in operation 907). The mode transition may be identically applied even when the pressure value of the touch input reaches the threshold value or higher from below the threshold value.

In operation 911, the (touch) controller 150 may transmit touch data corresponding to the touch input to the processor 140 at a second frequency (e.g., 60 Hz to 200 Hz) in the second mode (the active mode). According to an embodiment, the second frequency may be higher than a first frequency that will be described below.

In operation 913, the (touch) controller 150 may remain in the first mode (e.g., the idle mode) since the pressure value of the touch input is lower than the threshold value ("No" in operation 907). The (touch) controller 150 may transmit the touch data corresponding to the touch input to the processor 140 at the first frequency (e.g., 30 Hz to 40 Hz) in the first mode.

Figure 10A:
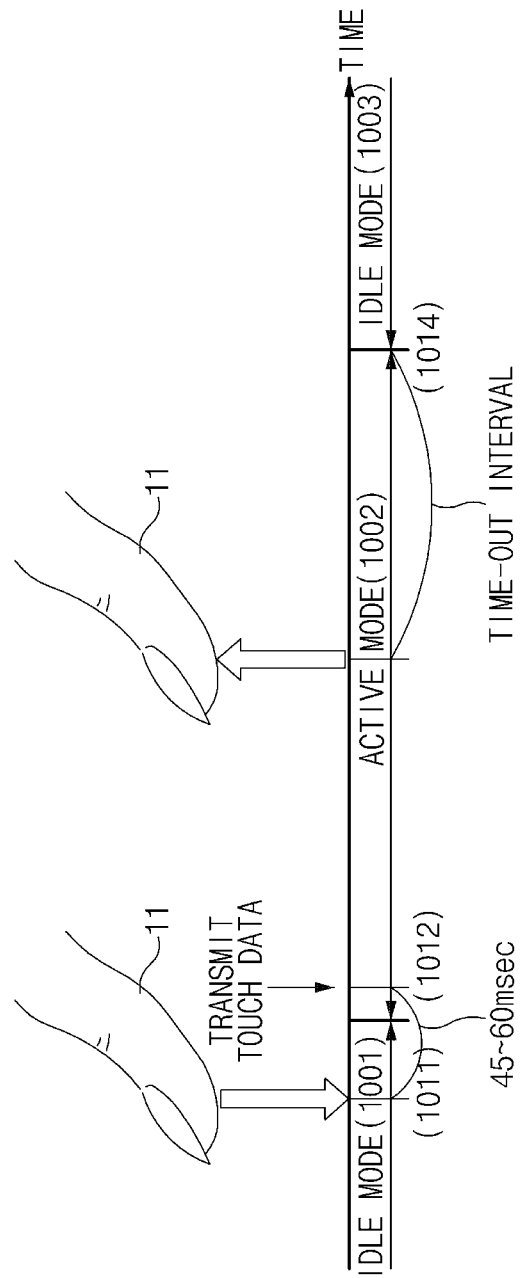
FIGS. 10A and 10B are views for explaining a mode transition operation of a general touch controller.
Figure 10B:
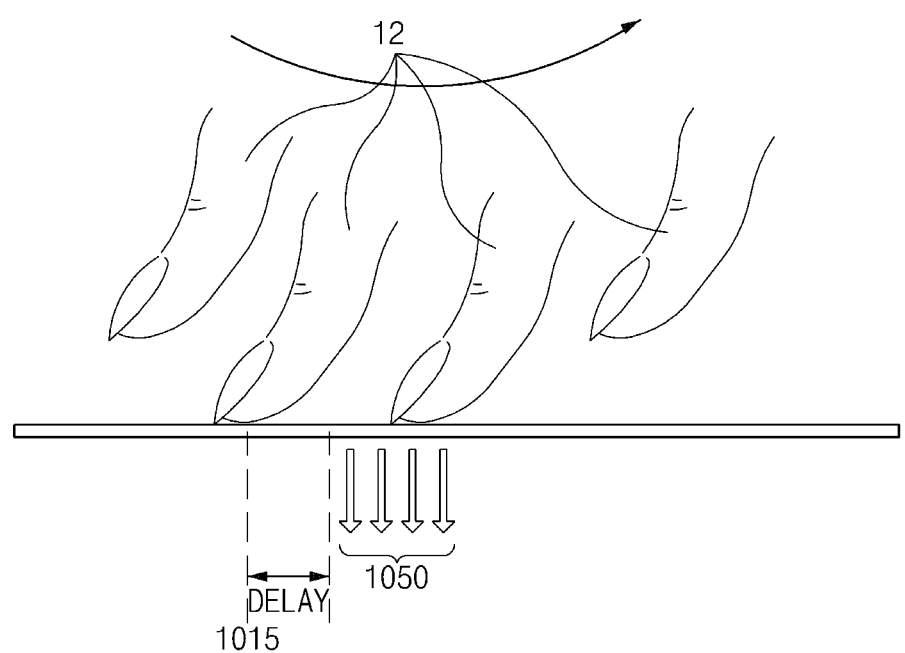

FIGS. 10A and 10B are views for explaining a mode transition operation of a general touch controller.

Referring to FIG. 10A, for example, when a touch input 1011 by a user's finger 11 is received in an idle mode 1001, a general touch controller may transmit touch data corresponding to the touch input 1011 to a processor after a delay time of about 45 msec to about 60 msec (see reference numeral 1012). The delay time (between 1011 and 1012) may result from time (what is called debounce time) required to determine whether the touch input 1011 is an available touch, time required to switch from the idle mode 1001 to an active mode 1002, and the like.

Referring to FIG. 10B, the delay may cause a degradation in the responsiveness to a touch of the user. For example, when the user performs scrolling on a display by using a finger 12, a movement of the touch for about 45 msec to about 60 msec from the first touch-down 1015 may be delayed or lost.

According to various embodiments of the present disclosure, a transition between an idle mode and an active mode may be immediately performed by using a pressure sensor with a high reaction speed (or response speed) of about 1 msec to about 5 msec. According to various embodiments of the present disclosure, the transition between the idle mode and the active mode may be performed in real time, based on a pressure value detected by the pressure sensor, and thus user-experienced performance, such as response speed, touch responsiveness, and the like, may be improved. Furthermore, in the active mode, a report rate of touch data transmitted from a touch controller to a processor may be dynamically set depending on the strength (pressure value) of a touch of the user, and thus user-experienced performance may be further improved.

Referring again to FIG. 10A, the general touch controller may remain in the active mode 1002 over a time-out interval of about 30 seconds when the touch input by the user's finger 11 is released while the general touch controller is in the active mode 1002. The general touch controller may enter an idle mode 1003 after the time-out interval (see reference numeral 1014). The time-out interval may correspond to an interval that is set to recognize a subsequent touch input that may be received immediately. Since the touch controller has to operate in an active mode over the time-out interval, more power than necessary may be consumed.

Figure 11A:
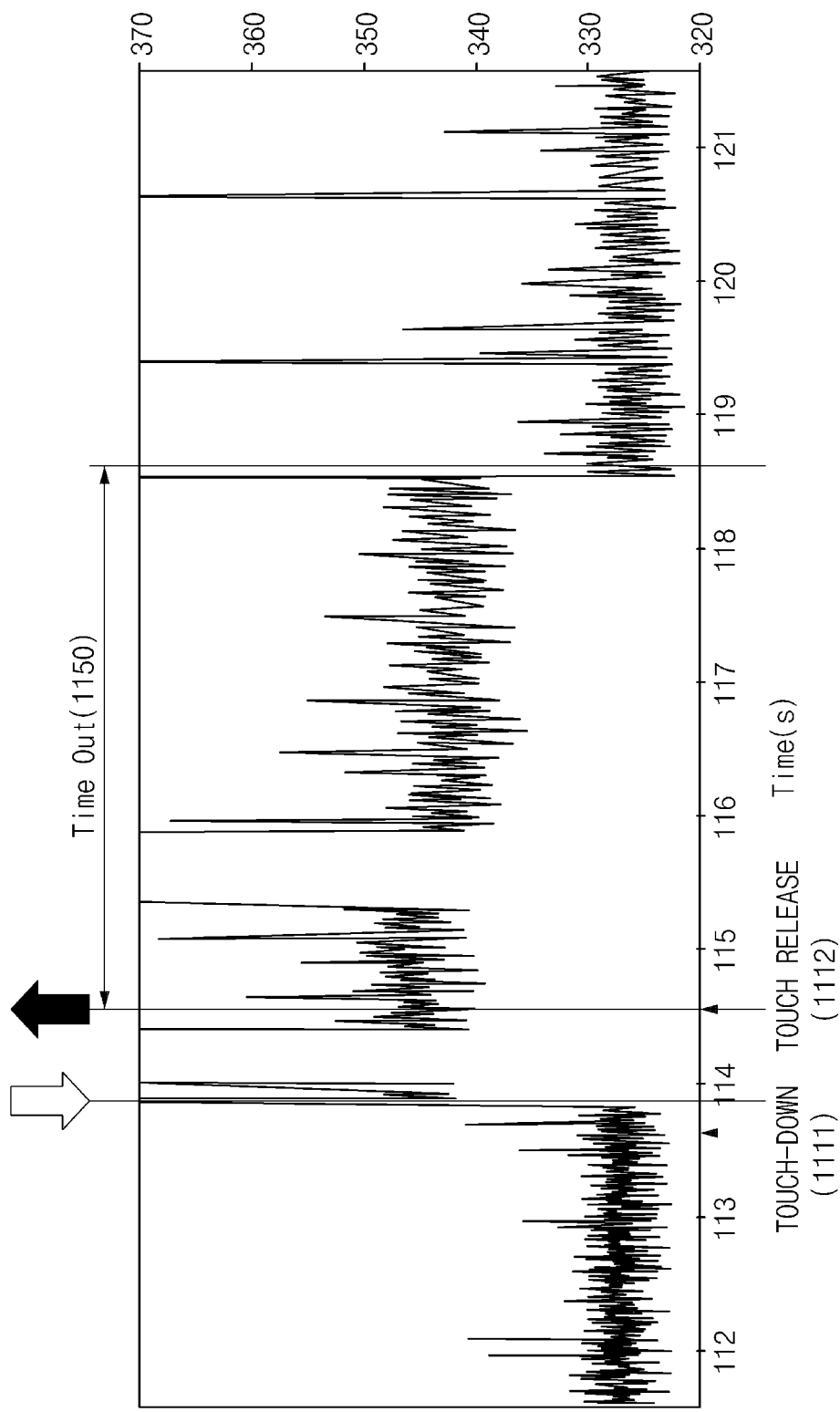
FIG. 11 illustrates a graph depicting current consumption depending on touch-down and touch release.
Figure 11B:
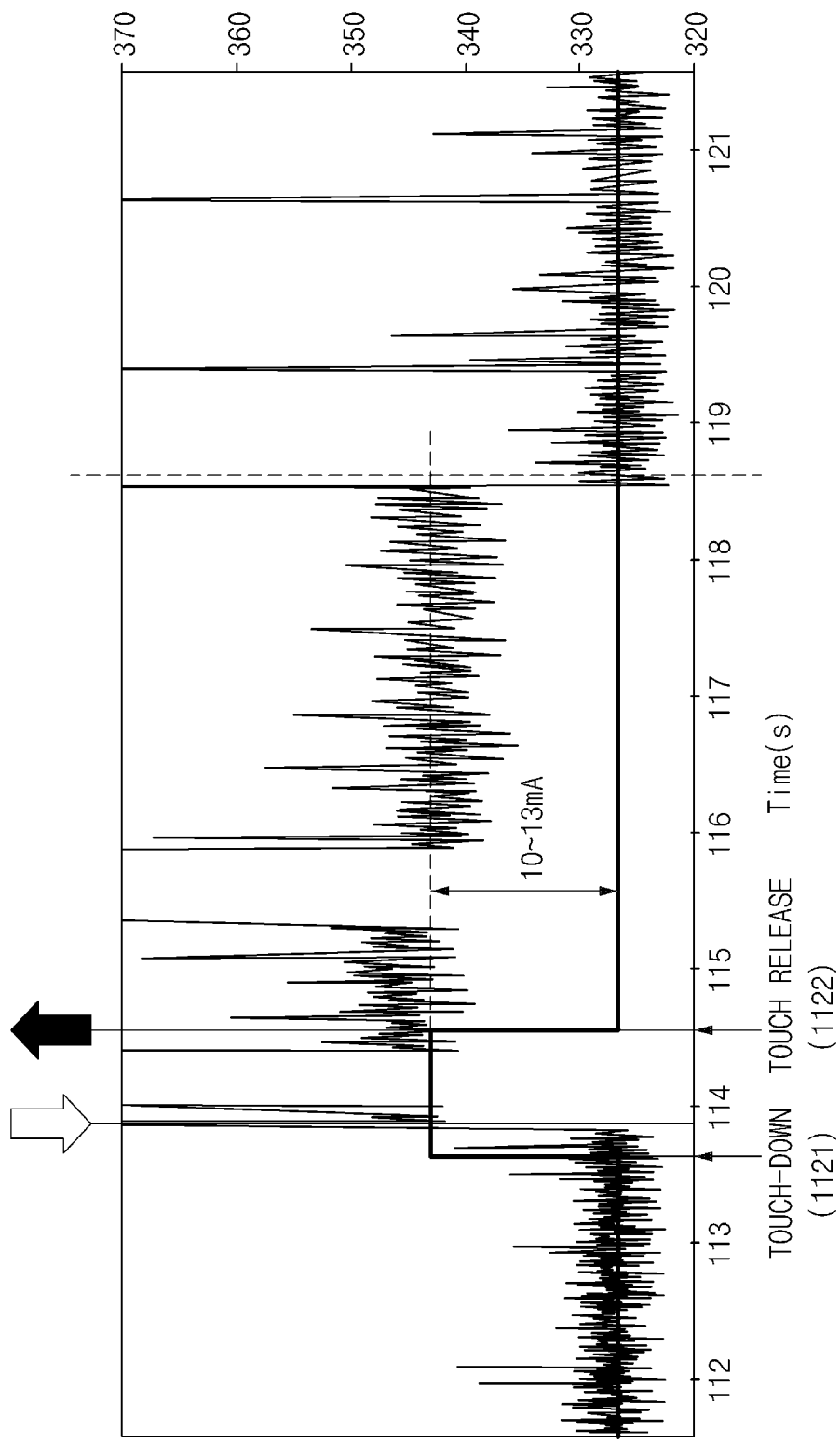

Referring to FIG. 11, a graph depicting current consumption depending on touch-down 1121 and touch release 1122 is illustrated. A curve 1120 represents current consumption of a general touch controller, and a curve 1130 schematically represents current consumption according to an embodiment of the present disclosure. Comparing the curve 1120 and the curve 1130, it can be seen that the current consumption in the curve 1130 is less than that in the curve 1120 by about 10 mA to about 13 mA for about four seconds after the time of about 114.6 seconds. That is because the general touch controller has to secure a time-out interval (between about 114.6 seconds and about 118.6 seconds) even though the touch release 1122 is performed.

According to an embodiment of the present disclosure, a transition between an idle mode and an active mode may be performed in real time, and therefore the time-out interval is not required. Accordingly, the current of 10 mA to 13 mA may not be consumed.

Figure 12:
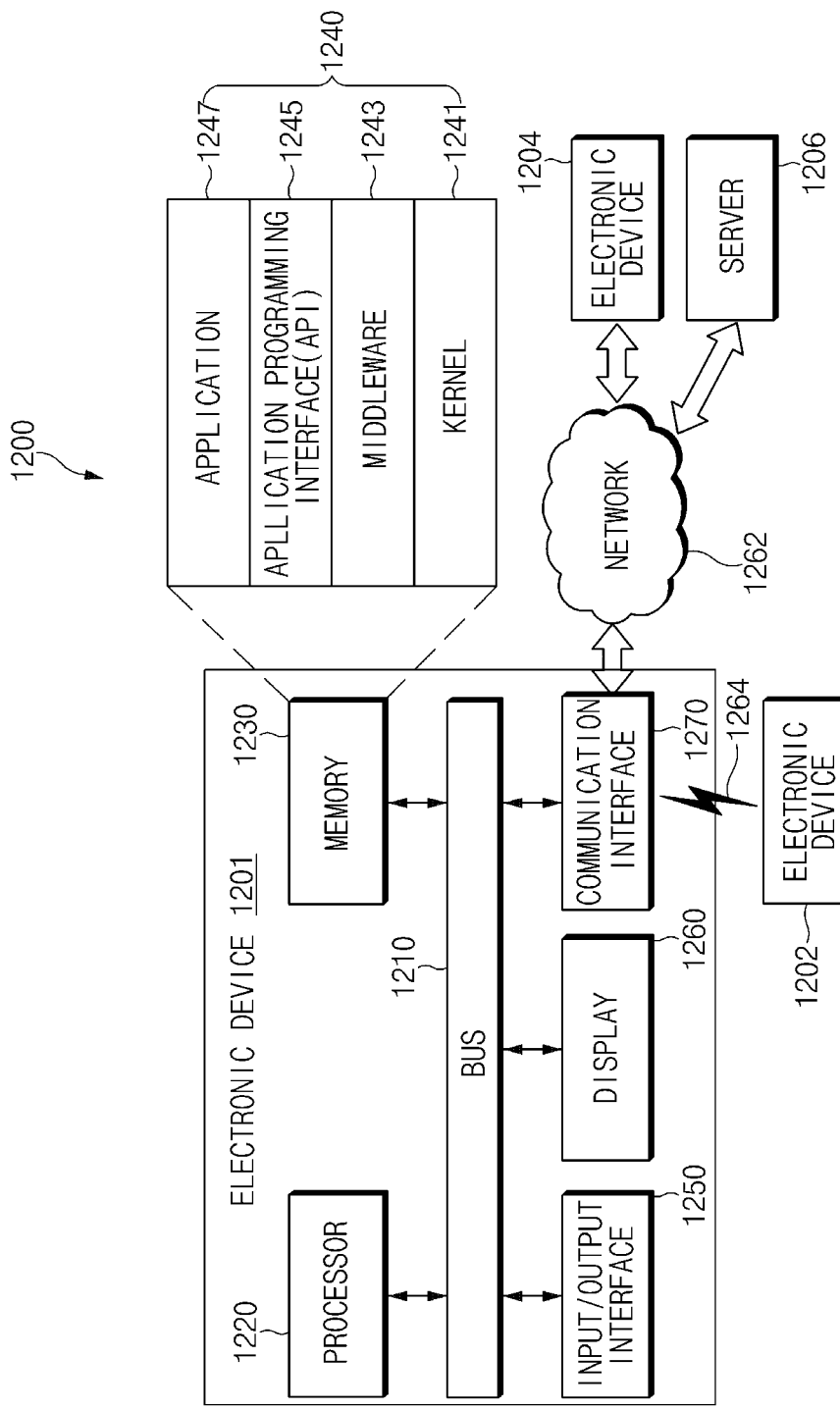
FIG. 12 illustrates an electronic device in a network environment according to various embodiments.

FIG. 12 illustrates an electronic device in a network environment system, according to various embodiments.

Referring to FIG. 12, according to various embodiments, an electronic device 1201, 1202, or 1204, or a server 1206 may be connected each other over a network 1262 or a short range communication 1264. The electronic device 1201 may include a bus 1210, a processor 1220, a memory 1230, an input/output interface 1250, a display 1260, and a communication interface 1270. According to an embodiment, the electronic device 1201 may not include at least one of the above-described elements or may further include other element(s).

For example, the bus 1210 may interconnect the above-described elements 1210 to 1270 and may include a circuit for conveying communications (e.g., a control message and/or data) among the above-described elements.

The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store commands or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits a command or data input from a user or another external device, to other element(s) of the electronic device 1201. Furthermore, the input/output interface 1250 may output a command or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first external electronic device 1202, the second external electronic device 1204, or the server 1206). For example, the communication interface 1270 may be connected to the network 1262 over wireless communication or wired communication to communicate with the external device (e.g., the second external electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the electronic device 1202 or 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 from another device (e.g., the electronic device 1202 or 1204 or the server 1206). The other electronic device (e.g., the electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
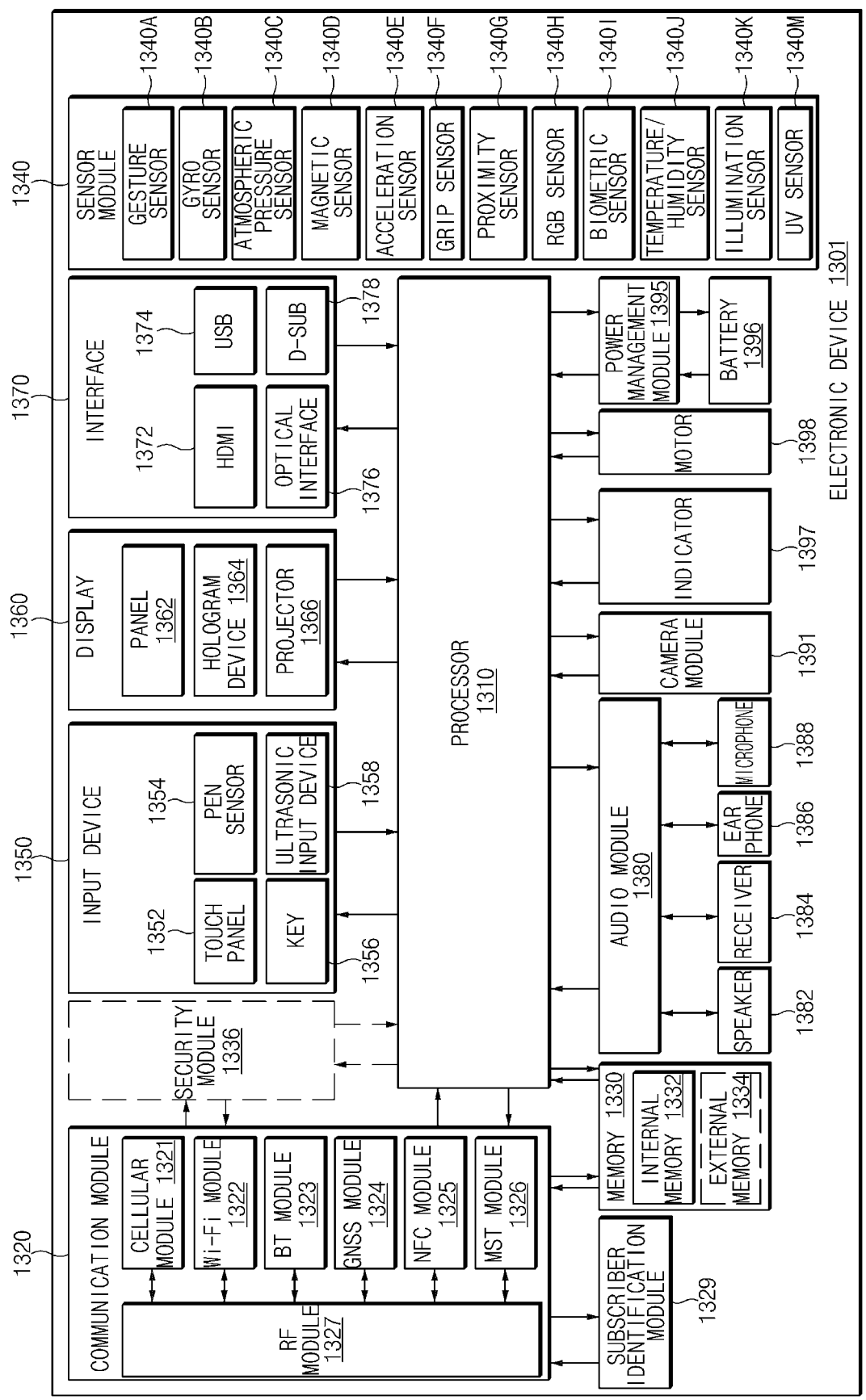
FIG. 13 illustrates a block diagram of an electronic device according to various embodiments.

FIG. 13 illustrates a block diagram of an electronic device, according to various embodiments Referring to FIG. 13, an electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load a command or data, which is received from at least one of other elements (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, and the MST module 1326 may be included within one Integrated Circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal. According to an embodiment, the touch panel 1352 may include a pressure sensor (or force sensor) that measures the intensity of touch pressure by a user. The pressure sensor may be implemented integrally with the touch panel 1352, or may be implemented as at least one sensor separately from the touch panel 1352.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 14:
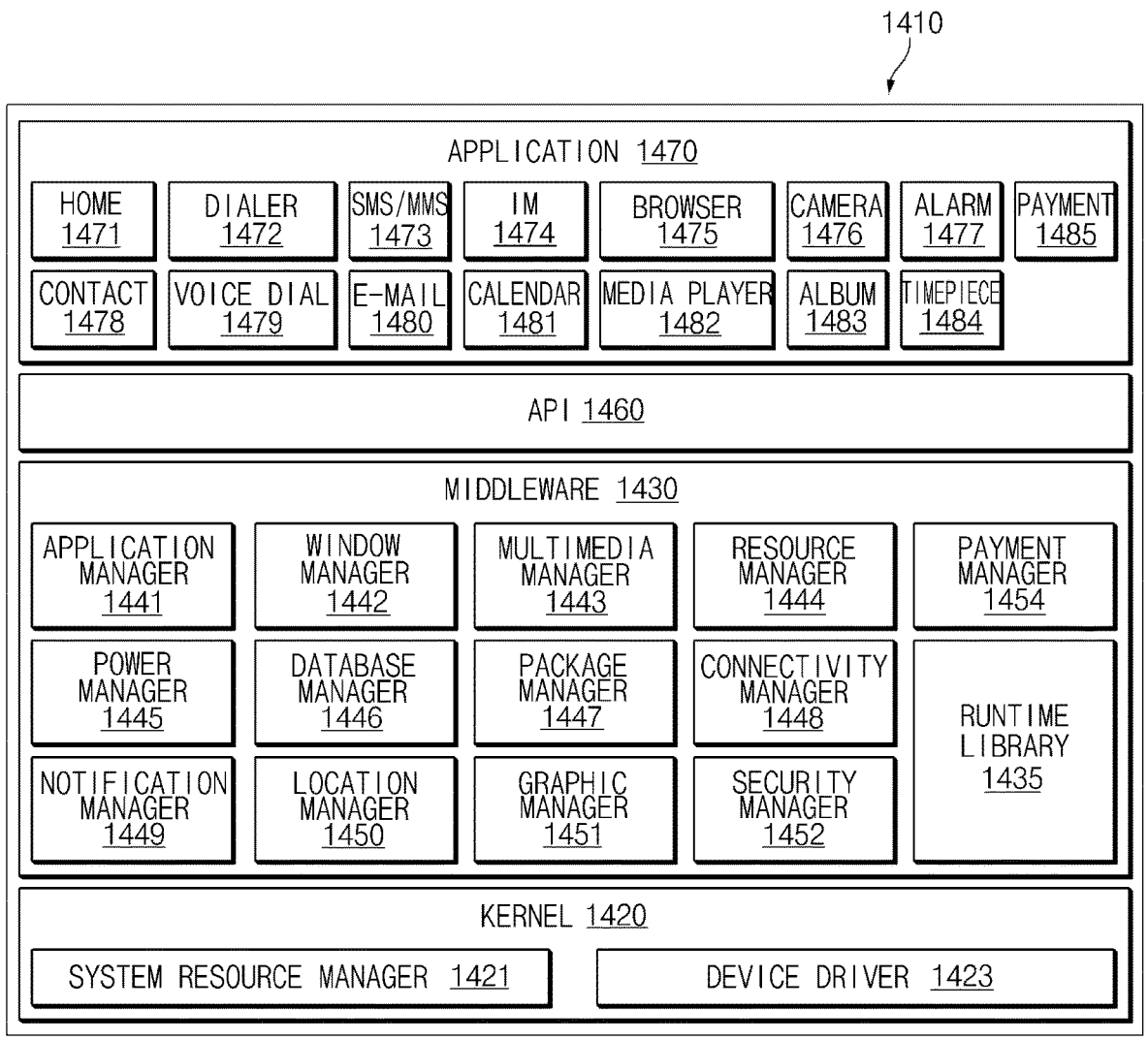
FIG. 14 illustrates a block diagram of a program module according to various embodiments.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™, iOS™, Windows™, Symbian™, Tizen™, or Bada™.

The program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the electronic device 1202 or 1204, the server 1206, or the like).

The kernel 1420 (e.g., the kernel 1241) may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each OS kind to provide differentiated functions. Additionally, the middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, and a payment 1485 or for offering health care (e.g., measuring an exercise quantity, blood sugar, or the like) or environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the electronic device 1202 or 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1202 or 1204). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1202 or 1204) which communicates with the electronic device, an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device (e.g., the electronic device 1202 or 1204). According to an embodiment, the application 1470 may include an application that is received from an external electronic device (e.g., the server 1206 or the electronic device 1202 or 1204). According to an embodiment, the application 1470 may include a preloaded application or a third party application that is downloadable from a server. The names of elements of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

As described above, an electronic device according to an embodiment may include a touch panel including a touch sensor, a pressure sensor, and a controller. The controller may obtain a pressure value corresponding to a user input through the pressure sensor and may switch an operating mode of the touch sensor from a first mode to a second mode when the pressure value satisfies a specified condition.

In the electronic device according to an embodiment, the controller may switch the operating mode from the first mode to the second mode in response to the user input when the pressure value is higher than or equal to a threshold value.

In the electronic device according to an embodiment, the first mode may correspond to an idle mode, and the second mode may correspond to an active mode.

In the electronic device according to an embodiment, the controller may obtain touch data corresponding to the user input at a specified frequency through the touch sensor, and the specified frequency may be variably set depending on the pressure value.

In the electronic device according to an embodiment, the specified frequency may be set to rise with an increase in the pressure value.

In the electronic device according to an embodiment, the controller may obtain touch data corresponding to the user input at a first frequency through the touch sensor when the pressure value is lower than a threshold value in the first mode.

In the electronic device according to an embodiment, the controller may switch the operating mode from the first mode to the second mode when the pressure value rises to the threshold value or higher, and may obtain the touch data corresponding to the user input at a second frequency higher than the first frequency through the touch sensor in the second mode.

An electronic device according to an embodiment may include a processor, a touch panel that receives a touch input, a pressure sensor that detects a pressure value of the touch input, and a controller that transmits touch data corresponding to the touch input to the processor. The controller may switch an operating mode of the controller from a first mode to a second mode in response to the touch input when the pressure value of the touch input is higher than or equal to a threshold value, and may transmit the touch data to the processor in the second mode.

In the electronic device according to an embodiment, the controller may switch the operating mode to the first mode in response to a reduction in the pressure value of the touch input to below the threshold value.

In the electronic device according to an embodiment, the first mode may correspond to an idle mode, and the second mode may correspond to an active mode.

In the electronic device according to an embodiment, the controller may transmit the touch data to the processor at a specified frequency. The specified frequency may be variably set depending on the pressure value of the touch input.

In the electronic device according to an embodiment, the specified frequency may be set to rise with an increase in the pressure value of the touch input.

In the electronic device according to an embodiment, the controller may transmit the touch data to the processor at a first frequency when the pressure value of the touch input is lower than the threshold value in the first mode.

In the electronic device according to an embodiment, the controller may switch the operating mode from the first mode to the second mode when the pressure value of the touch input rises to the threshold value or higher, and may transmit the touch data to the processor at a second frequency higher than the first frequency in the second mode.

In the electronic device according to an embodiment, the controller may transmit a specified interrupt to the processor before transmitting the touch data, and the processor may receive the touch data in response to the receipt of the specified interrupt.

In the electronic device according to an embodiment, the touch data may include coordinates of the touch input on the touch panel and the pressure value of the touch input.

In the electronic device according to an embodiment, the pressure sensor may correspond to at least one of a capacitive pressure sensor, a resistive pressure sensor, and a piezoelectric pressure sensor.

A touch recognition method according to an embodiment may include receiving a touch input by a touch panel, detecting a pressure value of the touch input by a pressure sensor, switching an operating mode from a first mode to a second mode by a controller in response to the touch input when the pressure value of the touch input is higher than or equal to a threshold value, and transmitting touch data corresponding to the touch input to a processor by the controller in the second mode.

The touch recognition method according to an embodiment may further include switching the operating mode to the first mode by the controller in response to a reduction in the pressure value of the touch input to below the threshold value.

In the touch recognition method according to an embodiment, the first mode may correspond to an idle mode, and the second mode may correspond to an active mode.

In the touch recognition method according to an embodiment, the transmitting of the touch data may include transmitting the touch data to the processor at a specified frequency, and the specified frequency may be variably set depending on the pressure value of the touch input.

In the touch recognition method according to an embodiment, the specified frequency may be set to rise with an increase in the pressure value of the touch input.

The touch recognition method according to an embodiment may further include transmitting the touch data to the processor at a first frequency by the controller when the pressure value of the touch input is lower than the threshold value in the first mode.

The touch recognition method according to an embodiment may further include switching the operating mode from the first mode to the second mode by the controller when the pressure value of the touch input rises to the threshold value or higher and transmitting the touch data to the processor at a second frequency higher than the first frequency by the controller in the second mode.

The touch recognition method according to an embodiment may further include transmitting a specified interrupt to the processor by the controller before transmitting the touch data and receiving the touch data by the processor in response to the receipt of the specified interrupt.

In the touch recognition method according to an embodiment, the touch data may include coordinates of the touch input on the touch panel and the pressure value of the touch input.

A computer-readable storage medium according to an embodiment may store instructions that, when executed by at least one processor, cause a touch panel to receive a touch input, cause a pressure sensor to detect a pressure value of the touch input, cause a controller to switch an operating mode from a first mode to a second mode in response to the touch input when the pressure value of the touch input is higher than or equal to a threshold value, and cause the controller to transmit touch data corresponding to the touch input to the processor in the second mode.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1220), may cause the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:
1. An electronic device comprising:
   a display including a display panel and a touch panel, the touch panel including a touch sensor;
   a pressure sensor;
   a processor; and
   a controller connected to the display, the pressure sensor, and the processor,
   wherein the controller is configured to:
      in a sleep mode, obtain a user input using the touch panel;
      control the touch panel with a first sensing power and transmit touch data obtained through the touch panel to the processor in a first frequency;
      detect a pressure value of the user input using the pressure sensor;
      as the pressure value of the user input is increases over a threshold, transit to an active mode;
      in the active mode, control the touch panel with a second sensing power higher than the first sensing power and transmit the touch data to the processor in a second frequency higher than the first frequency; and
      switch back to the sleep mode as the pressure value of the user input is decreased to a value below the threshold.
2. The electronic device of claim 1, wherein the controller is configured to increase the second frequency as the pressure value of the user input is increased.
3. The electronic device of claim 1, wherein the touch panel is disposed above the display panel.
4. The electronic device of claim 1, wherein the controller is configured to obtain the touch data corresponding to the user input at the first frequency through the touch sensor in the sleep mode.
5. The electronic device of claim 4, wherein the controller is configured to:
   obtain the touch data corresponding to the user input at the second frequency through the touch sensor in the active mode.

\* \* \* \* \*